(12) United States Patent
Kim et al.

(10) Patent No.: US 10,488,218 B2
(45) Date of Patent: Nov. 26, 2019

(54) VEHICLE USER INTERFACE APPARATUS AND VEHICLE

(71) Applicant: LG ELECTRONICS INC., Seoul (KR)

(72) Inventors: Ilwan Kim, Seoul (KR); Jaeho Lee, Seoul (KR); Sunghwan Choi, Seoul (KR); Dukyung Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 117 days.

(21) Appl. No.: 15/692,380

(22) Filed: Aug. 31, 2017

(65) Prior Publication Data

US 2018/0066956 A1    Mar. 8, 2018

(30) Foreign Application Priority Data

Sep. 2, 2016  (KR) .................. 10-2016-0113358

(51) Int. Cl.
| | | |
|---|---|---|
| *G01C 21/36* | (2006.01) | |
| *G06F 16/29* | (2019.01) | |
| *G02B 27/01* | (2006.01) | |
| *G06T 19/00* | (2011.01) | |

(52) U.S. Cl.
CPC ..... *G01C 21/3682* (2013.01); *G01C 21/3638* (2013.01); *G02B 27/01* (2013.01); *G06F 16/29* (2019.01); *G06T 19/006* (2013.01)

(58) Field of Classification Search
CPC . G01C 21/3682; G01C 21/3638; G06F 16/29; G02B 27/01; G06T 19/006
USPC ....................................................... 701/438
See application file for complete search history.

(56) References Cited

U.S. PATENT DOCUMENTS

| | | | |
|---|---|---|---|
| 9,179,140 B2* | 11/2015 | Shimotani | G01C 21/365 |
| 2013/0293582 A1* | 11/2013 | Ng-Thow-Hing | G06T 19/006 |
| | | | 345/633 |
| 2014/0362195 A1* | 12/2014 | Ng-Thow-Hing | ................... |
| | | | G06K 9/00791 |
| | | | 348/51 |
| 2016/0252362 A1* | 9/2016 | Tertoolen | G01C 21/3635 |
| | | | 701/428 |
| 2017/0054973 A1* | 2/2017 | Kasazumi | B60K 35/00 |
| 2017/0187963 A1* | 6/2017 | Lee | G06F 3/013 |
| 2017/0350718 A1* | 12/2017 | Schulz | B60K 35/00 |

(Continued)

FOREIGN PATENT DOCUMENTS

| | | |
|---|---|---|
| KR | 10-2014-0058312 | 5/2014 |
| KR | 20140058312 A * | 5/2014 |

(Continued)

OTHER PUBLICATIONS

KR-20140058312-A English translation from KPO 2014.*

(Continued)

*Primary Examiner* — Yazan A Soofi
(74) *Attorney, Agent, or Firm* — Fish & Richardson P.C.

(57) ABSTRACT

Disclosed is a vehicle user interface apparatus including a display unit, an interface, and a processor configured to receive a vehicle external image via the interface, specify a first area corresponding to a preset Point of Interest (POI) in the vehicle external image, control the display unit to display a graphic object of augmented reality on the vehicle external image to point out the first area, and control the display unit to display the graphic object along a travel lane to point out the first area.

20 Claims, 26 Drawing Sheets

(56) References Cited

U.S. PATENT DOCUMENTS

2018/0066956 A1* 3/2018 Kim .................. G01C 21/3682

FOREIGN PATENT DOCUMENTS

| KR | 10-1588184 | 1/2016 |
| KR | 10-1619392 | 5/2016 |

OTHER PUBLICATIONS

International Search Report in International Application No. PCT/KR2017/009554, dated Dec. 27, 2017, 3 pages (with English translation).

* cited by examiner

VEHICLE USER INTERFACE APPARATUS AND VEHICLE

CROSS-REFERENCE TO RELATED APPLICATION

This application claims the priority benefit of Korean Patent Application No. 10-2016-0113358, filed on Sep. 2, 2016 in the Korean Intellectual Property Office, the disclosure of which is incorporated herein by reference.

BACKGROUND OF THE INVENTION

1. Field of the Invention

The present invention relates to a vehicle user interface apparatus and a vehicle.

2. Description of the Related Art

A vehicle is an apparatus that moves in a direction desired by a user riding therein. A representative example of a vehicle may be an automobile.

Meanwhile, a variety of sensors and electronic devices have been mounted in vehicles for the convenience of a user who uses the vehicle. In particular, for user driving convenience, an Advanced Driver Assistance System (ADAS) has been actively studied. In addition, enormous efforts have been being made to develop autonomous vehicles.

Recently, a vehicle user interface apparatus includes a Head Up Display (HUD) which displays a graphic object of augmented reality.

However, an HUD according to the conventional art uniformly displays a graphic object corresponding a Point of Interest (POI). As a result, the graphic object or the POI is displayed as being hidden behind a different object, and this leads to confusion to a user.

SUMMARY OF THE INVENTION

The present invention has been made in view of the above problems, and it is one object of the present invention to provide a vehicle user interface apparatus that displays a graphic object corresponding to a Point of Interest (POI) in a manner that is suitable for driving environment.

It is another object of the present invention to provide a vehicle including the vehicle user interface apparatus.

Objects of the present invention should not be limited to the aforementioned objects and other unmentioned objects will be clearly understood by those skilled in the art from the following description.

In accordance with an embodiment of the present invention, the above and other objects can be accomplished by the provision of a vehicle user interface apparatus including a display unit, an interface, and a processor configured to receive a vehicle external image via the interface, specify a first area corresponding to a preset Point of Interest (POI) in the vehicle external image, control the display unit to display a graphic object of augmented reality on the vehicle external image to point out the first area, and control the display unit to display the graphic object along a travel lane to point out the first area.

The details of other embodiments are included in the following description and the accompanying drawings.

Embodiments of the present invention have one or more of the following effects.

First, driving environment is considered to display a graphic object pointing at a POI, and therefore, the POI may be pointed out more accurately and clearly with augmented reality.

Second, a user may be able to drive a vehicle while perceiving an accurate location of a POI, so that the driving may be done efficiently.

Third, a graphic object may be displayed with various graphic effects in association with driving environment, so that a user may be able to perceive information.

Effects of the present invention should not be limited to the aforementioned effects and other unmentioned effects will be clearly understood by those skilled in the art from the claims.

BRIEF DESCRIPTION OF THE DRAWINGS

The embodiments will be described in detail with reference to the following drawings in which like reference numerals refer to like elements wherein.

DETAILED DESCRIPTION OF THE PREFERRED EMBODIMENTS

Figure 1:
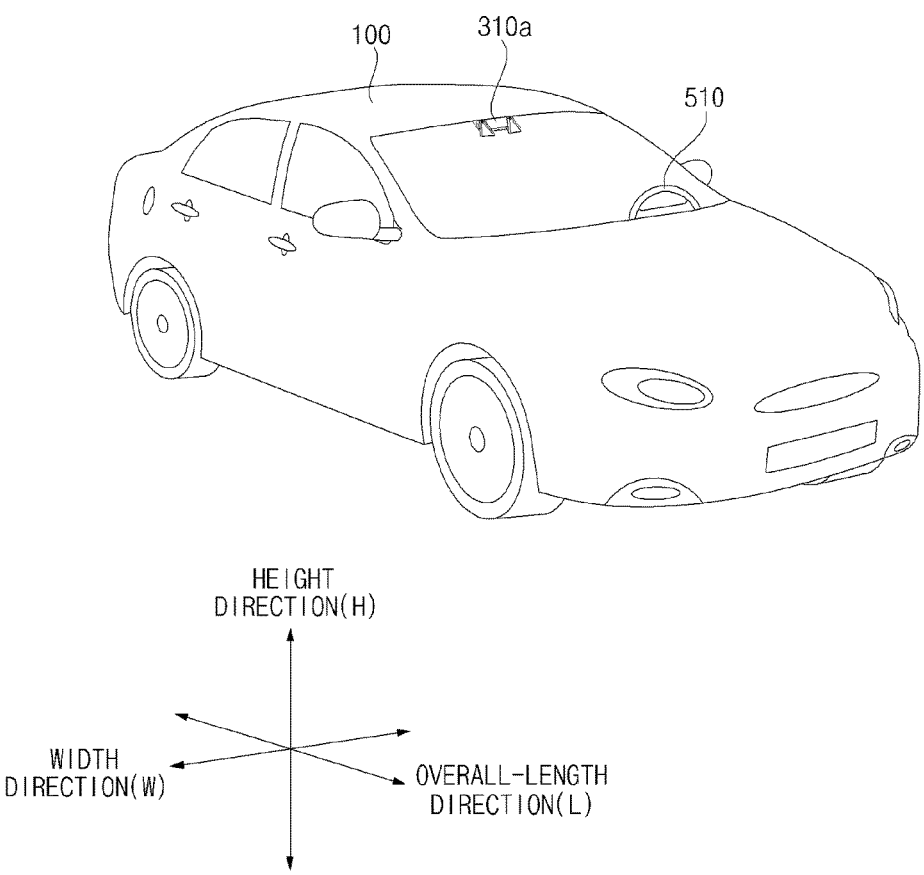
FIG. 1 is a view illustrating the external appearance of a vehicle according to an embodiment of the present invention.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present invention.

It will be understood that although the terms "first," "second," etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise.

In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include an automobile and a motorcycle. Hereinafter, a description will be given based on an automobile.

A vehicle as described in this specification may include all of an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

FIG. 1 is a view of the external appearance of a vehicle according to an embodiment of the present invention.

Figure 2:
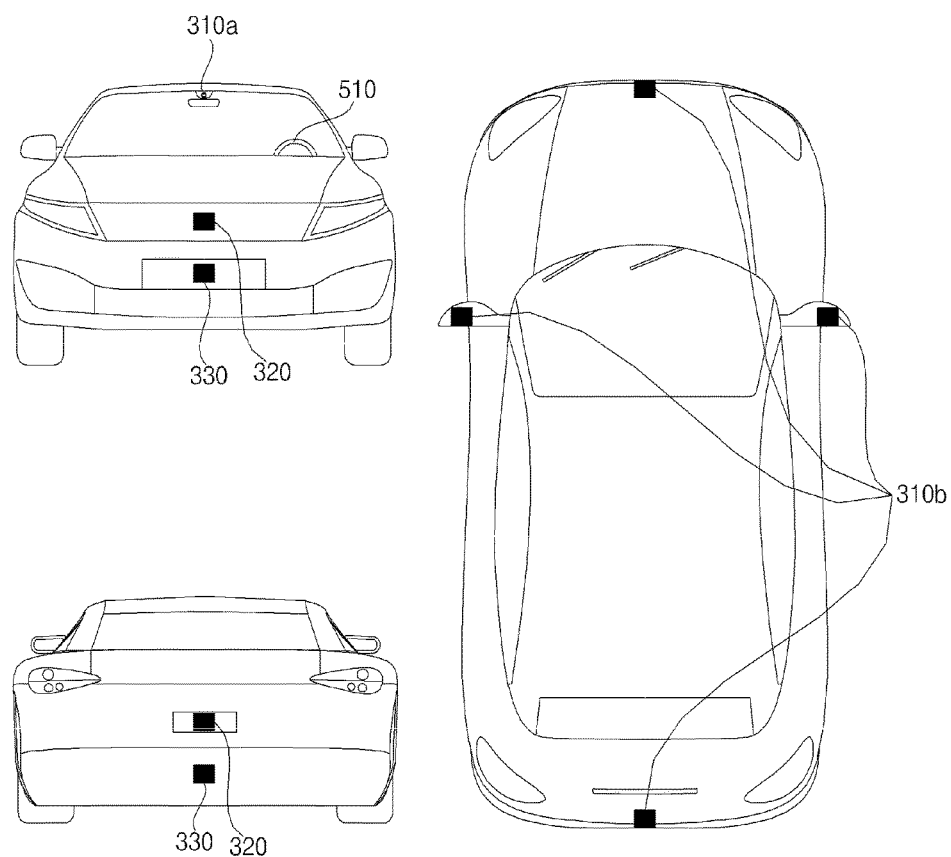
FIG. 2 are different angled views of the external appearance of a vehicle according to an embodiment of the present invention.

FIG. 2 is different angled views of a vehicle according to an embodiment of the present invention.

Figure 3:
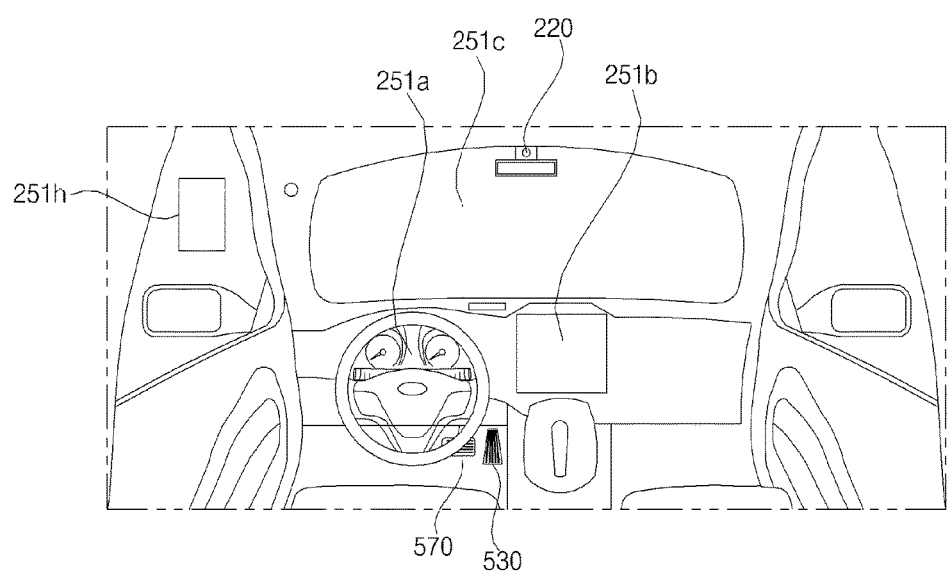
FIGS. 3 and 4 are views illustrating the interior configuration of a vehicle according to an embodiment of the present invention.
Figure 4:
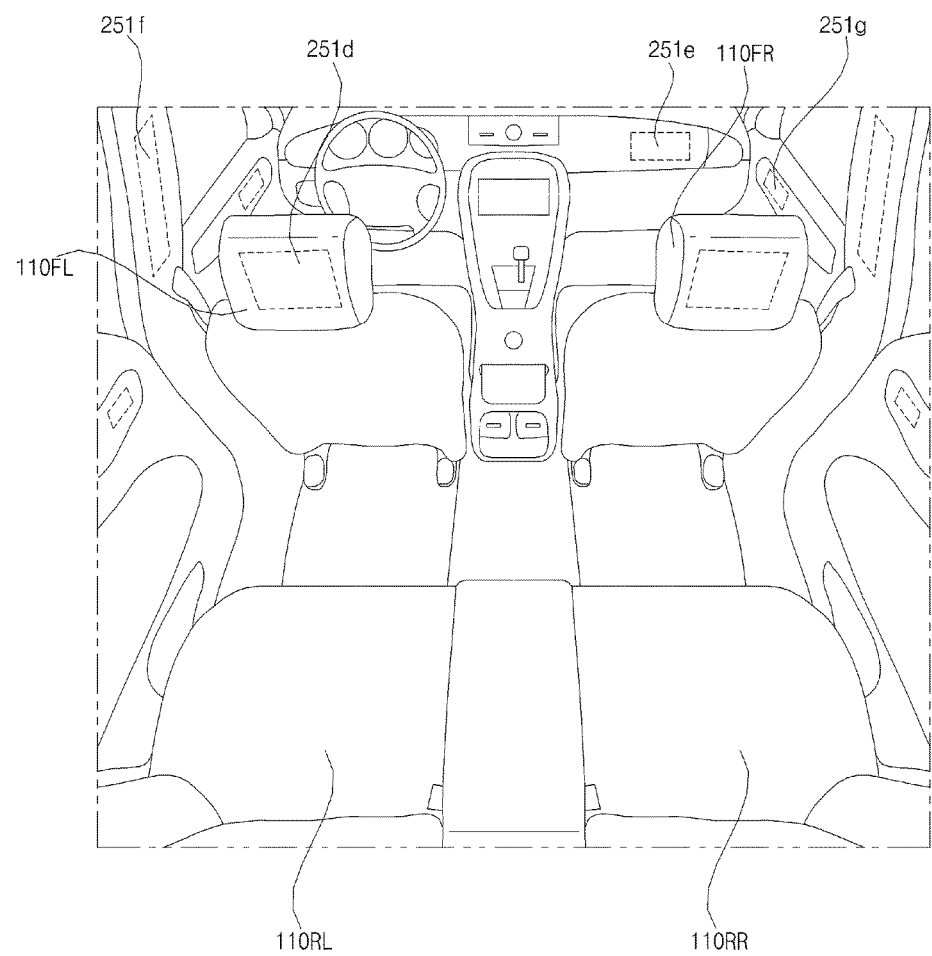

FIGS. 3 and 4 are views of the internal configuration of a vehicle according to an embodiment of the present invention.

Figure 5:
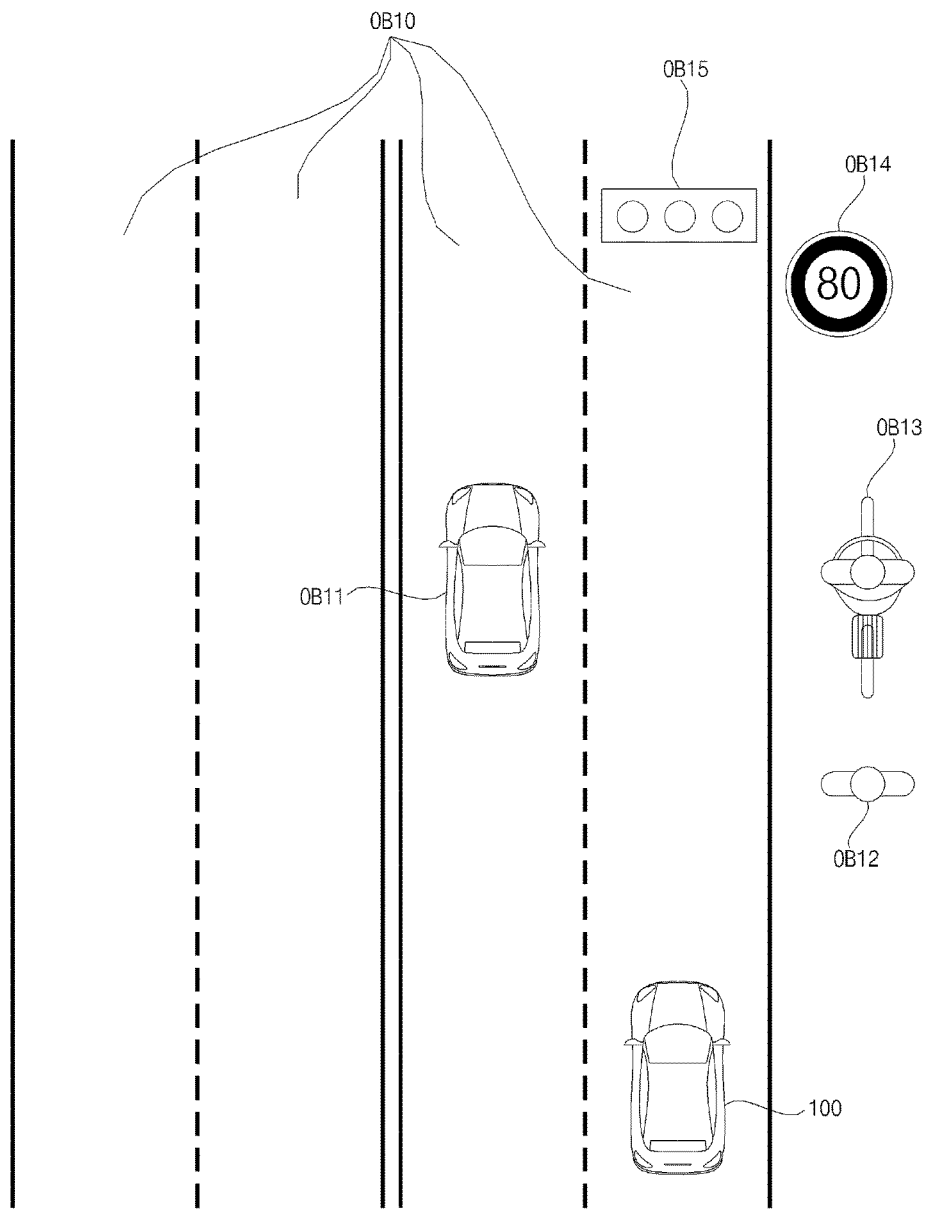
FIGS. 5 and 6 are views for explanation of an object according to an embodiment of the present invention.
Figure 6:
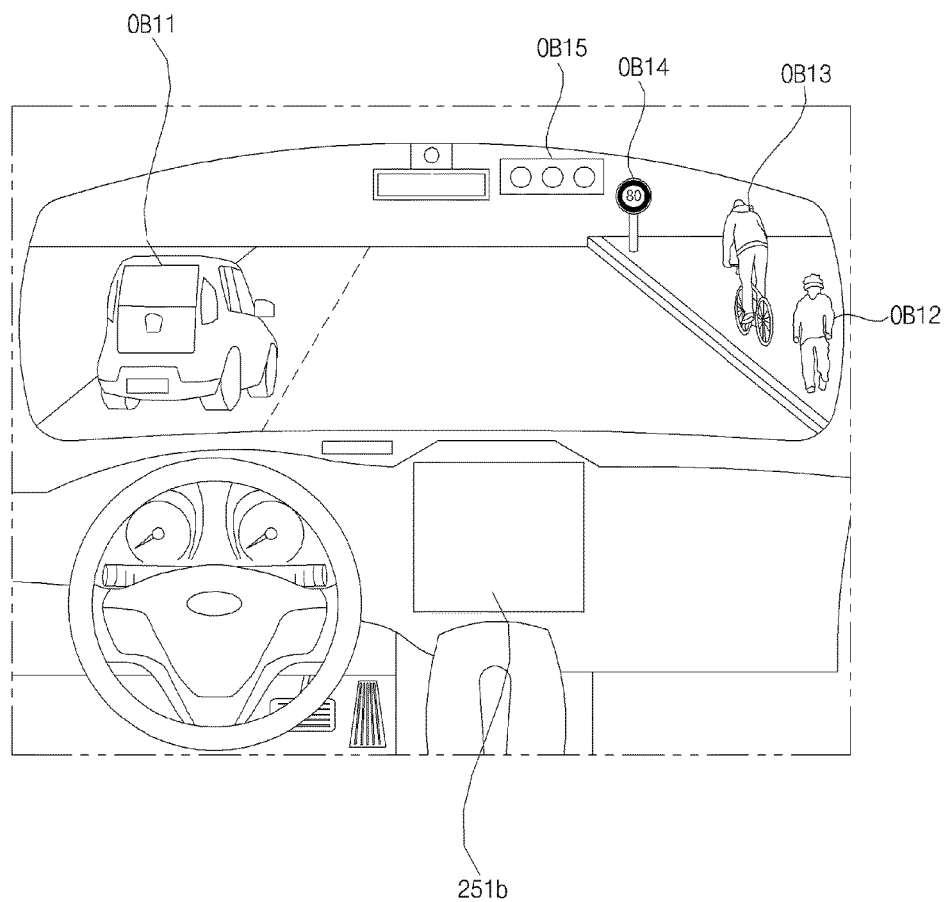

FIGS. 5 and 6 are views for explanation of objects according to an embodiment of the present invention.

Figure 7:
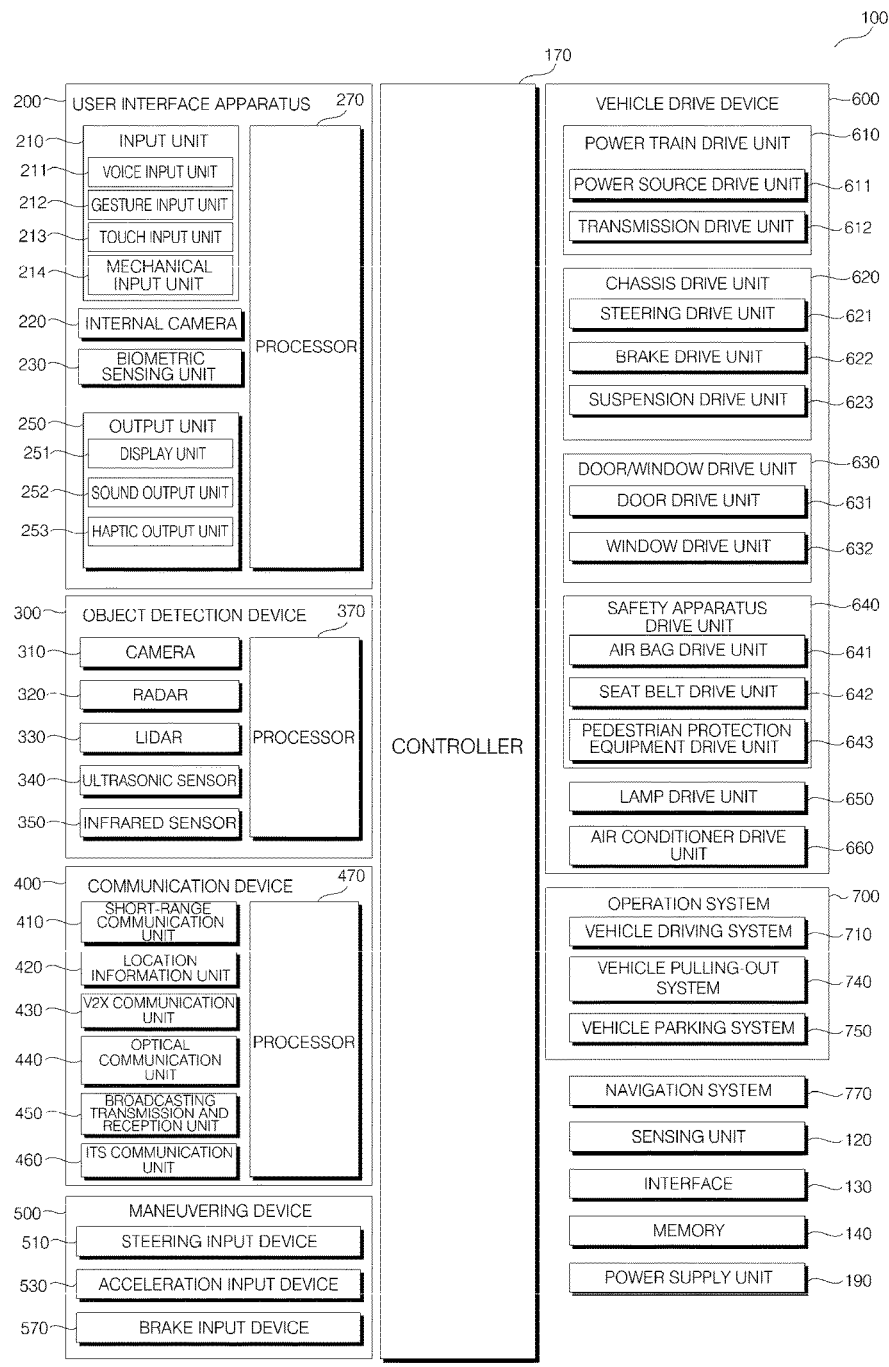
FIG. 7 is a block diagram illustrating a vehicle according to an embodiment of the present invention.

FIG. 7 is a block diagram illustrating a vehicle according to an embodiment of the present invention.

Referring to FIGS. 1 to 7, a vehicle 100 may include a plurality of wheels, which are rotated by a power source, and a steering input device 510 for controlling a driving direction of the vehicle 100.

The vehicle 100 may be an autonomous vehicle.

The vehicle 100 may be switched to an autonomous driving mode or a manual mode in response to a user input.

For example, in response to a user input received through a user interface apparatus 200, the vehicle 100 may be switched from a manual mode to an autonomous driving mode, or vice versa.

The vehicle 100 may be switched to the autonomous driving mode or to the manual mode based on driving environment information. The driving environment information may be generated based on object information provided by an object detection device 300.

For example, the vehicle 100 may be switched from the manual mode to the autonomous driving mode, or vice versa, based on driving environment information generated by the object detection device 300.

In another example, the vehicle 100 may be switched from the manual mode to the autonomous driving mode, or vice versa, based on driving environment information received through a communication device 400.

The vehicle 100 may be switched from the manual mode to the autonomous driving mode, or vice versa, based on information, data, and a signal provided from an external device.

When the vehicle 100 operates in the autonomous driving mode, the autonomous vehicle 100 may operate based on an operation system 700.

For example, the autonomous vehicle 100 may operate based on information, data, or signals generated by a driving system 710, a vehicle pulling-out system 740, and a vehicle parking system 750.

While operating in the manual mode, the autonomous vehicle 100 may receive a user input for driving of the vehicle 100 through a maneuvering device 500. In response to the user input received through the maneuvering device 500, the vehicle 100 may operate.

The term "overall length" means the length from the front end to the rear end of the vehicle 100, the term "overall width" means the width of the vehicle 100, and the term "overall height" means the height from the bottom of the wheel to the roof. In the following description, the term "overall length direction L" may mean the reference direction for the measurement of the overall length of the vehicle 100, the term "overall width direction W" may mean the reference direction for the measurement of the overall width of the vehicle 100, and the term "overall height direction H" may mean the reference direction for the measurement of the overall height of the vehicle 100.

As illustrated in FIG. 7, the vehicle 100 may include the user interface apparatus 200, the object detection device 300, the communication device 400, the maneuvering device 500, a vehicle drive device 600, the operation system 700, a navigation system 770, a sensing unit 120, an interface 130, a memory 140, a controller 170, and a power supply unit 190.

In some embodiments, the vehicle 100 may further include other components in addition to the aforementioned components, or may not include some of the aforementioned components.

The user interface apparatus 200 is provided to support communication between the vehicle 100 and a user. The user interface apparatus 200 may receive a user input, and provide information generated in the vehicle 100 to the user. The vehicle 100 may enable User Interfaces (UI) or User Experience (UX) through the user interface apparatus 200.

The user interface apparatus 200 may include an input unit 210, an internal camera 220, a biometric sensing unit 230, an output unit 250, and a processor 270.

In some embodiments, the user interface apparatus 200 may further include other components in addition to the aforementioned components, or may not include some of the aforementioned components.

The input unit 210 is configured to receive information from a user, and data collected in the input unit 210 may be analyzed by the processor 270 and then processed into a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170.

The voice input unit 211 may include one or more microphones.

The gesture input unit 212 may convert a gesture input of a user into an electrical signal. The converted electrical signal may be provided to the processor 270 or the controller 170.

The gesture input unit 212 may include at least one selected from among an infrared sensor and an image sensor for sensing a gesture input of a user.

In some embodiments, the gesture input unit 212 may sense a three-dimensional (3D) gesture input of a user. To this end, the gesture input unit 212 may include a plurality of light emitting units for outputting infrared light, or a plurality of image sensors.

The gesture input unit 212 may sense the 3D gesture input by employing a Time of Flight (TOF) scheme, a structured light scheme, or a disparity scheme.

The touch input unit 213 may convert a user's touch input into an electrical signal. The converted electrical signal may be provided to the processor 270 or the controller 170.

The touch input unit 213 may include a touch sensor for sensing a touch input of a user.

In some embodiments, the touch input unit 210 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170.

The mechanical input unit 214 may be located on a steering wheel, a center fascia, a center console, a cockpit module, a door, etc.

The internal camera 220 may acquire images of the inside of the vehicle 100. The processor 270 may sense a user's condition based on the images of the inside of the vehicle 100. The processor 270 may acquire information on an eye gaze of the user. The processor 270 may sense a gesture of the user from the images of the inside of the vehicle 100.

The biometric sensing unit 230 may acquire biometric information of the user. The biometric sensing unit 230 may include a sensor for acquire biometric information of the user, and may utilize the sensor to acquire finger print information, heart rate information, etc. of the user. The biometric information may be used for user authentication.

The output unit 250 is configured to generate a visual, audio, or tactile output.

The output unit 250 may include at least one selected from among a display unit 251, a sound output unit 252, and a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as an HUD. When implemented as a HUD, the display unit 251 may include a projector module in order to output information through an image projected on a windshield or a window.

The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

Meanwhile, the user interface apparatus 200 may include a plurality of display units 251*a* to 251*g*.

The display unit 251 may be disposed in a region of a steering wheel, a region 251*a*, 251*b* or 251*e* of an instrument panel, a region 251*d* of a seat, a region 251*f* of each pillar, a region 251*g* of a door, a region of a center console, a region of a head lining, a region of a sun visor, a region 251c of a windshield, or a region 251h of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output.

The processor 270 may control the overall operation of each unit of the user interface apparatus 200.

In some embodiments, the user interface apparatus 200 may include a plurality of processors 270 or may not include the processor 270.

In a case where the user interface apparatus 200 does not include the processor 270, the user interface apparatus 200 may operate under control of the controller 170 or a processor of a different device inside the vehicle 100.

Meanwhile, the user interface apparatus 200 may be referred to as a display device for vehicle.

The user interface apparatus 200 may operate under control of the controller 170.

The object detection device 300 is configured to detect an object outside the vehicle 100. The objection detection device 300 may generate object information based on sensing data.

The object information may include information as to whether an object exists, location information of the object, information on distance between the vehicle 100 and the object, and information on speed of the vehicle relative to the object.

The object may include various objects related to travelling of the vehicle 100.

Referring to FIGS. 5 and 6, an object o may include a lane OB10, a nearby vehicle OB11, a pedestrian OB12, a two-wheeled vehicle OB13, a traffic signal OB14 and OB15, a light, a road, a structure, a bump, a geographical feature, an animal, etc.

The lane OB10 may be a lane in which the vehicle 100 is traveling or a lane next to the lane in which the vehicle 100 is traveling. The lane OB10 may include left and right lines that define the lane.

The nearby vehicle OB11 may be a vehicle that is travelling in the vicinity of the vehicle 100. The nearby vehicle OB11 may be a vehicle within a predetermined distance from the vehicle 100. For example, the nearby vehicle OB11 may be a vehicle that is preceding or following the vehicle 100.

The pedestrian OB12 may be a person in the vicinity of the vehicle 100. The pedestrian OB12 may be a person within a predetermined distance from the vehicle 100. For example, the pedestrian OB12 may be a person on a sidewalk or on the road.

The two-wheeled vehicle OB13 is a vehicle that is located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the road.

The traffic signal may include a traffic light OB15, a traffic sign plate OB14, and a pattern or text painted on a road surface.

The light may be light generated by a lamp provided in the nearby vehicle. The light may be light generated by a street light. The light may be solar light.

The road may include a road surface, a curve, and slopes, such as an upward slope and a downward slope.

The structure may be a body located around the road in the state of being fixed onto the ground. For example, the structure may include a streetlight, a roadside tree, a building, a traffic light, and a bridge.

The geographical feature may include a mountain and a hill.

Meanwhile, the object may be classified as a movable object or a stationary object. For example, the movable object may include a nearby vehicle and a pedestrian. For example, the stationary object may include a traffic signal, a road, and a structure.

The object detection device 300 may include a camera 310, a radar 320, a lidar 330, an ultrasonic sensor 340, an infrared sensor 350, and a processor 370.

In some embodiments, the object detection device 300 may further include other components in addition to the aforementioned components, or may not include some of the aforementioned components.

The camera 310 may be located at an appropriate position outside the vehicle 100 in order to acquire images of the outside of the vehicle 100. The camera 310 may be a mono camera, a stereo camera 310a, an Around View Monitoring (AVM) camera 310b, or a 360-degree camera.

Using various image processing algorithms, the camera 310 may acquire location information of an object, information on distance to the object, and information on speed relative to the object.

For example, based on change in size over time of an object in acquired images, the camera 310 may acquire information on distance to the object and information on speed relative to the object.

For example, the camera 310 may acquire the information on distance to the object and the information on speed relative to the object, by utilizing a pin hole model or profiling a road surface.

For example, the camera 310 may acquire the information on distance to the object and the information on the speed relative to the object, based on information on disparity in stereo images acquired by a stereo camera 310a.

For example, the camera 310 may be disposed near a front windshield in the vehicle 100 in order to acquire images of the front of the vehicle 100. Alternatively, the camera 310 may be disposed around a front bumper or a radiator grill.

In another example, the camera 310 may be disposed near a rear glass in the vehicle 100 in order to acquire images of the rear of the vehicle 100. Alternatively, the camera 310 may be disposed around a rear bumper, a trunk, or a tailgate.

In yet another example, the camera 310 may be disposed near at least one of the side windows in the vehicle 100 in order to acquire images of the side of the vehicle 100. Alternatively, the camera 310 may be disposed around a side mirror, a fender, or a door.

The camera 310 may provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object.

The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme.

The lidar 330 may be implemented as a drive type lidar or a non-drive type lidar.

When implemented as the drive type lidar, the lidar 300 may rotate by a motor and detect an object in the vicinity of the vehicle 100.

When implemented as the non-drive type lidar, the lidar 300 may utilize a light steering technique to detect an object located within a predetermined distance from the vehicle 100.

The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 340 may detect an object based on infrared light, and may detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection device 300.

The processor 370 may detect and track an object based on acquired images. The processor 370 may, for example, calculate the distance to the object and the speed relative to the object.

For example, the processor 370 may acquire information on the distance to the object and information on the speed relative to the object based on a variation in size over time of the object in acquired images.

In another example, the processor 370 may acquire information on the distance to the object or information on the speed relative to the object by employing a pin hole model or by profiling a road surface.

In yet another example, the processor 370 may acquire information on the distance to the object and information on the speed relative to the object based on information on disparity in stereo images acquired from the stereo camera 310a.

The processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect and track an object based on a reflection laser light which is formed as a result of reflection of transmission laser by the object. Based on the laser light, the processor 370 may, for example, calculate the distance to the object and the speed relative to the object.

The processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect and track an object based on reflection infrared light which is formed as a result of reflection of transmission infrared light by the object. Based on the infrared light, the processor 370 may, for example, calculate the distance to the object and the speed relative to the object.

In some embodiments, the object detection device 300 may include a plurality of processors 370 or may not include the processor 370. For example, each of the camera 310, the radar 320, the lidar 330, the ultrasonic sensor 340, and the infrared sensor 350 may include its own processor.

In a case where the object detection device 300 does not include the processor 370, the object detection device 300 may operate under control of the controller 170 or a processor inside the vehicle 100.

The object detection device 300 may operate under control of the controller 170.

The communication device 400 is configured to perform communication with an external device. Here, the external device may be a nearby vehicle, a mobile terminal, or a server.

To perform communication, the communication device 400 may include at least one selected from among a transmission antenna, a reception antenna, a Radio Frequency (RF) circuit capable of implementing various communication protocols, and an RF device.

The communication device 400 may include a short-range communication unit 410, a location information unit 420, a V2X communication unit 430, an optical communication unit 440, a broadcast transmission and reception unit 450, an Intelligent Transport Systems (ITS) communication unit 460, and a processor 470.

In some embodiments, the communication device 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some embodiments, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic information from the traffic system and provide the traffic information to the controller 170. In another example, the ITS communication unit 460 may receive a control signal from the traffic system, and provide the control signal to the controller 170 or a processor provided in the vehicle 100.

The processor 470 may control the overall operation of each unit of the communication device 400.

In some embodiments, the communication device 400 may include a plurality of processors 470, or may not include the processor 470.

In a case where the communication device 400 does not include the processor 470, the communication device 400 may operate under control of the controller 170 or a processor of a device inside of the vehicle 100.

Meanwhile, the communication device 400 may implement a vehicle display device, together with the user interface apparatus 200. In this case, the vehicle display device may be referred to as a telematics device or an Audio Video Navigation (AVN) device.

The communication device 400 may operate under control of the controller 170.

The maneuvering device 500 is configured to receive a user input for driving the vehicle 100.

In the manual mode, the vehicle 100 may operate based on a signal provided by the maneuvering device 500.

The maneuvering device 500 may include a steering input device 510, an acceleration input device 530, and a brake input device 570.

The steering input device 510 may receive a user input with regard to the direction of travel of the vehicle 100. The steering input device 510 may take the form of a wheel to enable a steering input through the rotation thereof. In some embodiments, the steering input device may be provided as a touchscreen, a touch pad, or a button.

The acceleration input device 530 may receive a user input for acceleration of the vehicle 100. The brake input device 570 may receive a user input for deceleration of the vehicle 100. Each of the acceleration input device 530 and the brake input device 570 may take the form of a pedal. In some embodiments, the acceleration input device or the break input device may be configured as a touch screen, a touch pad, or a button.

The maneuvering device 500 may operate under control of the controller 170.

The vehicle drive device 600 is configured to electrically control the operation of various devices of the vehicle 100.

The vehicle drive device 600 may include a power train drive unit 610, a chassis drive unit 620, a door/window drive unit 630, a safety apparatus drive unit 640, a lamp drive unit 650, and an air conditioner drive unit 660.

In some embodiments, the vehicle drive device 600 may further include other components in addition to the aforementioned components, or may not include some of the aforementioned components.

Meanwhile, the vehicle drive device 600 may include a processor. Each unit of the vehicle drive device 600 may include its own processor.

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In a case where an electric motor is the power source, the power source drive unit 611 may control the motor. The power source drive unit 610 may control, for example, the RPM and toque of the motor under control of the controller 170.

The transmission drive unit 612 may control a transmission.

The transmission drive unit 612 may adjust the state of the transmission. The transmission drive unit 612 may adjust a state of the transmission to a drive (D), reverse (R), neutral (N), or park (P) state.

Meanwhile, in a case where an engine is the power source, the transmission drive unit 612 may adjust a gear-engaged state to the drive position D.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

Meanwhile, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

Meanwhile, the suspension drive unit 623 may control a plurality of suspensions individually.

The door/window drive unit 630 may perform electronic control of a door apparatus or a window apparatus inside the vehicle 100.

The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive device 600 may include a processor. Each unit of the vehicle dive device 600 may include its own processor.

The vehicle drive device 600 may operate under control of the controller 170.

The operation system 700 is a system for controlling the overall driving operation of the vehicle 100. The operation system 700 may operate in the autonomous driving mode.

The operation system 700 may include the driving system 710, the vehicle pulling-out system 740, and the vehicle parking system 750.

In some embodiments, the operation system 700 may further include other components in addition to the aforementioned components, or may not include some of the aforementioned component.

Meanwhile, the operation system 700 may include a processor. Each unit of the operation system 700 may include its own processor.

Meanwhile, in some embodiments, in a case where the operation system 700 is implemented as software, the operation system 700 may be a subordinate concept of the controller 170.

Meanwhile, in some embodiments, the operation system 700 may be a concept including at least one selected from among the user interface apparatus 200, the object detection device 300, the communication device 400, the vehicle drive device 600, and the controller 170.

The driving system 710 may perform driving of the vehicle 100.

The driving system 710 may perform driving of the vehicle 100 by providing a control signal to the vehicle drive device 600 in response to reception of navigation information from the navigation system 770.

The driving system 710 may perform driving of the vehicle 100 by providing a control signal to the vehicle drive device 600 in response to reception of object information from the object detection device 300.

The driving system 710 may perform driving of the vehicle 100 by providing a control signal to the vehicle drive device 600 in response to reception of a signal from an external device through the communication device 400.

The vehicle pulling-out system 740 may perform an operation of pulling the vehicle 100 out of a parking space.

The vehicle pulling-out system 740 may perform an operation of pulling the vehicle 100 out of a parking space, by providing a control signal to the vehicle drive device 600 in response to reception of navigation information from the navigation system 770.

The vehicle pulling-out system 740 may perform an operation of pulling the vehicle 100 out of a parking space, by providing a control signal to the vehicle drive device 600 in response to reception of object information from the object detection device 300.

The vehicle pulling-out system 740 may perform an operation of pulling the vehicle 100 out of a parking space, by providing a control signal to the vehicle drive device 600 in response to reception of a signal from an external device.

The vehicle parking system 750 may perform an operation of parking the vehicle 100 in a parking space.

The vehicle parking system 750 may perform an operation of parking the vehicle 100 in a parking space, by providing a control signal to the vehicle drive device 600 in response to reception of navigation information from the navigation system 770.

The vehicle parking system 750 may perform an operation of parking the vehicle 100 in a parking space, by providing a control signal to the vehicle drive device 600 in response to reception of object information from the object detection device 300.

The vehicle parking system 750 may perform an operation of parking the vehicle 100 in a parking space, by providing a control signal to the vehicle drive device 600 in response to reception of a signal from an external device.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and a processor. The memory may store navigation information. The processor may control the operation of the navigation system 770.

In some embodiments, the navigation system 770 may update pre-stored information by receiving information from an external device through the communication device 400.

In some embodiments, the navigation system 770 may be classified as an element of the user interface apparatus 200.

The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, out-of-vehicle illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The interface 130 may serve as a passage for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

Meanwhile, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some embodiments, the memory 140 may be integrally formed with the controller 170, or may be provided as an element of the controller 170.

The controller 170 may control the overall operation of each unit inside the vehicle 100. The controller 170 may be referred to as an Electronic Controller (ECU).

The power supply unit 190 may supply power required to operate each component under control of the controller 170. In particular, the power supply unit 190 may receive power from, for example, a battery inside the vehicle 100.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Figure 8A:
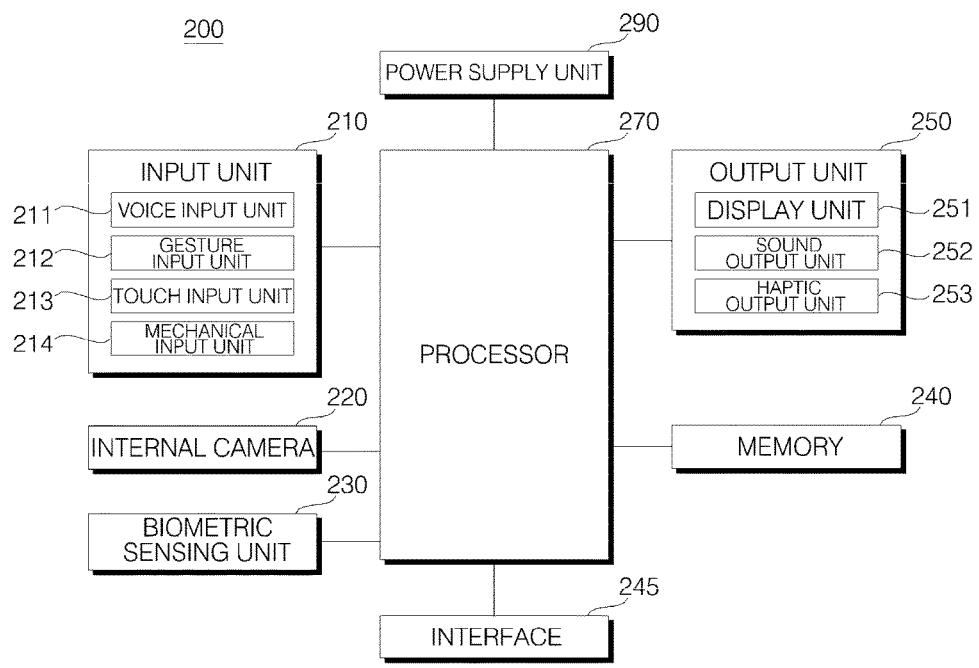
FIG. 8A is a block diagram illustrating a vehicle user interface apparatus according to an embodiment of the present invention.

FIG. 8A is a block diagram illustrating a vehicle user interface according to an embodiment of the present invention.

Referring to FIG. 8A, a vehicle user interface 200 may include an input unit 210, an internal camera 220, a biometric sensing unit 230, a memory 240, an interface 245, an output unit 250, a processor 270, and a power supply unit 290.

In some embodiments, the user interface apparatus 200 may further include other components to the aforementioned components, or may not include some of the aforementioned components.

The vehicle user interface apparatus 200 shown in FIG. 8A includes the components of the vehicle user interface apparatus 200 shown in FIG. 7. Hereinafter, the same descriptions provided above with reference to FIG. 7 are omitted.

The vehicle user interface apparatus 200 according to an embodiment of the present invention may be referred to as a vehicle display device.

The description as provided above with reference to FIG. 7 may be applied to the input unit 210, the internal camera 220, and the biometric sensing unit 230.

The memory 240 is electrically connected to the processor 270. The memory 240 may store basic data of each unit, control data for controlling the operation of each unit, and input/output data. The memory 240 may be any of various hardware storage devices, such as a ROM, a RAM, an EPROM, a flash drive, and a hard drive. The memory 240 may store various data for the overall operation of the user interface 200, such as programs for the processing or control of the processor 270.

In some embodiments, the memory 240 may be integrally formed with the processor 270, or may be an element of the processor 270.

The interface 245 may exchange information, data, or a signal with a different device included in the vehicle 100. the interface 245 may transmit the received information, data, or signal to the processor 270. The interface 245 may transmit information, data, or a signal generated or processed by the processor 270 to a different device included in the vehicle 100. The interface 245 may receive information, data, or a signal from a different device included in the vehicle 100.

The interface 245 may receive a vehicle external image from the object detection device 300.

The interface 245 may receive object information from the object detection device 300. For example, the interface 245 may receive information on disparity of a plurality of objects included in the external image.

The interface 245 may receive navigation information from the navigation system 770.

Information, data, or a signal received by the interface 245 may be provided to the processor 270.

The output unit 250 may include a display unit 251, a sound output unit 252, and a haptic output unit 253.

The description provided above with reference to FIG. 7 may be applied to the output unit 250. Hereinafter, the description primarily about the display unit 251 is provided.

The display unit 251 may operate under control of the processor 270.

The display unit 251 may display a graphic object of augmented reality. For example, the display unit 251 may display a graphic object of augmented reality, pointing at a Point of Interest (POI), on a vehicle external image In this case, the display unit 251 may display the graphic object along a travel lane to point out the POI.

For example, when the POI is located on the left side of the travel lane, the display unit 251 may display the graphic object on the right side of the POI.

For example, when the POI is located on the right side of the travel lane, the display unit 251 may display the graphic object on the left side of the POI.

The POI may be a building. A first area may be an area corresponding to a building in a vehicle external image. In this case, the display unit 251 may display a graphic object from a point of view of the vehicle 100 to point out a portion of the first area in which a building shape is positioned.

The display unit 251 may display the graphic object to gradually move over time from the first area to a second area which is closer to the POI than the first area.

When the graphic object corresponds to an area corresponding to a different object, the display unit 251 may add transparency to the graphic object.

When any object is located between the vehicle 100 and the POI, the display unit 251 may further display a top-view image.

When any object is located between the vehicle 100 and the POI, the display unit 251 may display, from a point of view of the vehicle 100, an image acquired by a different vehicle located in the vicinity of the POI.

When an object is located between the vehicle 100 and the POI, the display unit 251 may display an image of simulation of driving from a location of the vehicle 100 to the POI.

The display unit 251 may display a graphic object in an area which does not correspond to the object in a vehicle external image.

When a graphic object is displayed in an area corresponding to a different object in a vehicle external image, the display unit 251 may add transparency to the different object or remove the different object.

The processor 270 may control the overall operation of each unit of the user interface apparatus 200.

The processor 270 may receive a vehicle external image via the interface 245. For example, the vehicle external image may be an image of a scene forward of the vehicle 100, which is acquired by a stereo camera.

The processor 270 may receive object information via the interface 245.

The processor 270 may specify a first area corresponding to a preset POI in the external image.

The POI may include a destination and a waypoint. The destination and the waypoint may be set by the navigation system 770 or by a user.

The POI may include a gas station, an electric vehicle charging station, a restaurant, a rest area, a landmark, and a tourist attraction.

The POI may be a place for which a user has been searched more than a reference number of times. For example, the POI may be a place for which a user has been searched more than the reference number of times with the user interface apparatus 200. In another example, the POI may be a place for which a user has been searched more than the reference number of times with a personal mobile terminal. The processor 270 may receive information on a POI from a mobile terminal via the interface 245 and the communication device 400.

The processor 270 may receive information on a POI from a web server via the interface 245 and the communication device 400. The information on a POI may be based on big data that is generated based on places input or searched by multiple users.

The processor 270 may control the display unit 251 to display a graphic object of augmented reality on a vehicle external image to point out the first area corresponding to the POI.

For example, the graphic object may be an icon in a specific shape, which points out an area corresponding to a POI.

The graphic object may include a body part and a tail part.

The body part may be an area in which information on an POI is displayed. The body part may be displayed with a first color. The body part may be in a circular, oval, polygonal, or 3D shape. In some embodiments, the processor 270 may control the display unit 251 to display text related to a POI in the body part.

The tail part may be an area which points out a first area corresponding to a POI. The tail part may connect the body part and the first area corresponding to the POI in a vehicle external image.

The processor 270 may display the graphic object to be overlaid on the vehicle external image.

The processor 251 may control the display unit 251 to display the graphic object along a travel lane to point out the first area corresponding to the POI.

The processor 270 may receive information on the travel lane from the object detection device 300. The processor 270 may distinguish an area corresponding to the travel lane in the vehicle external image based on the received information on the travel lane.

The processor 270 may determine whether an area corresponding to a POI is on the left or right side of the travel lane.

Based on a result of determination, the processor 270 may control the display unit 251 to display a graphic object along the travel lane to point out the POI.

In this manner, a graphic object may be displayed in an area which overlaps as less as possible with other objects in a vehicle external image. As a result, a user of the vehicle 100 may be able to clearly recognize the graphic object.

If a graphic object is displayed to be overlaid with various other objects on a vehicle external image, unlike the present invention, the user may incorrectly understand information provided from the vehicle user interface apparatus, and therefore, the user may drive the vehicle 100 along a wrong route or trigger an accident.

When the first area is located on the left side of the travel lane in a vehicle external image, the processor 270 may control the display unit 251 to display a graphic object on the right side of the first area.

When the first area is located on the right side of the travel lane in a vehicle external image, the processor 270 may control the display unit 251 to display a graphic object on the left side of the first area.

The POI may be a building.

The processor 270 may specify the first area corresponding to a building in a vehicle external image.

The processor 270 may control the display unit 251 to display a graphic object from a point of view of the vehicle 100 to point out a portion of the first area in which a building shape is positioned.

When seen from the vehicle 100, part of the building may be hidden behind a different object. In this case, the processor 270 may control the display unit 251 to display a graphic object to point out an unhidden part of the building, thereby allowing a user to recognize the POI clearly.

Based on a distance between the vehicle 100 and the POI, the processor 270 may determine a portion of the first area to be pointed out by the graphic object.

The processor 270 may set a plurality of sections regarding a distance between the vehicle 100 and a POI.

The processor 270 may receive information on a distance between the vehicle 100 and a POI from the object detection device 300 or the navigation system 770 via the interface 245.

The processor 270 may determine a portion of the first area to be pointed out based on one section from among the plurality of preset sections, to which the distance between the vehicle 100 and the POI corresponds.

For example, when the distance between the vehicle 100 and the POI corresponds to a first section, the processor 270 may control the display unit 251 to display a graphic object to point out a first portion of the first area in a vehicle external image.

In another example, when the distance between the vehicle 100 and the POI corresponds to a second section, the processor 270 may control the display unit 251 to display a graphic object to point out a second portion of the first area in a vehicle external image.

In yet another example, when the distance between the vehicle 100 and the POI corresponds to a third section, the processor 270 may control the display unit 251 to display a graphic object to point out a third portion of the first area in a vehicle external image.

The processor 270 may determine at least one of color, size, and a transparency level of the graphic object based on the distance between the vehicle 100 and the POI.

The processor 270 may set a plurality of sections regarding a distance between the vehicle 100 sand a POI.

The processor 270 may receive information on the distance between the vehicle 100 and the POI from the object detection device 300 or the navigation system 770 via the interface 245.

The processor 270 may determine at least one of color, size, and a transparency level of a graphic object based on one section from among a plurality of preset sections, to which the distance between the vehicle 100 and the POI corresponds.

For example, when the distance between the vehicle 100 and the POI corresponds to a first section, the processor 270 may control the display unit 251 to display the graphic object with a first color, a first size, or a first transparency level in a vehicle external image.

In another example, when the distance between the vehicle 100 and the POI corresponds to a second section, the processor 270 may control the display unit 251 to display a graphic object with a second color, a second size, or a second transparency level in a vehicle external image.

In yet another example, when the distance between the vehicle 100 and the POI corresponds to a third section, the processor 270 may control the display unit 251 to display the graphic object with a third color, a third size, or a third transparency level in a vehicle external image.

The processor 270 may determine size of the graphic object based on the distance between the vehicle 100 and the POI. The processor 270 may determine the size of the graphic object based on one section from among a plurality of preset sections, to which the distance between the vehicle 100 and the POI corresponds.

The processor 270 may determine color of the graphic object based on the distance between the vehicle 100 and the POI. The processor 270 may determine color of the graphic object based on one section from among a plurality of preset sections, to which the distance between the vehicle 100 and the POI corresponds.

In this manner, simply by glancing at a graphic object, a user of the vehicle 100 may be able to recognize an approximate distance between the vehicle 100 and a POI.

In addition, the closer the vehicle 100 approaches a POI, the more clearly the user may recognize a graphic object.

The processor 270 may determine whether any object is located between the vehicle 100 and a POI.

The processor 270 may determine whether the POI is hidden behind an object from a point of view of the vehicle 100.

The object may indicate any object other than the vehicle and the POI in a vehicle external image. For example, the object may be a nearby vehicle. In another example, the object may be a structure such as a streetlight, a roadside tree, a building, a traffic light, and a bridge. In yet another example, the object may be a geographical feature such as a mountain and a hill.

The processor 270 may receive navigation information via the interface 245. The navigation information may include three-dimensional (3D) map information.

Based on a vehicle external image and the navigation information, the processor 270 may determine whether any object is located between the vehicle 100 and an POI.

The processor 270 may merge coordinate systems to determine whether any object is located between the vehicle 100 and a POI. A situation in which an object is located between the vehicle 100 and the POI may be referred to as an overlaid state.

The 3D map information is based on a 3D coordinate system. The external image may be based on a two-dimensional (2D) coordinate system.

The processor 270 may determine as to an overlaid state by merging the 3D map information and the vehicle external image into a 2D or 3D coordinate system.

The processor 270 may receive sensing information of at least one of the radar 320, the lidar 330, the ultrasonic sensor 340, and the infrared sensor 350 via the interface 245.

Further based on the sensing information, the processor 270 may determine as to the overlaid state.

For example, the processor 270 may convert 3D map information into 2D map information. The processor 270 may compare a 2D map with a vehicle external image to determine whether any object is located between the vehicle 100 and a POI. The processor 270 may determine as to an overlaid state based on whether the POI is overlaid with a specific object at any pixel in a 2D coordinate system into which the 3D map information and the vehicle external image are merged.

In another example, the processor 270 may receive, via the interface 245, location information, size information, and disparity information of a plurality of objects included in a vehicle external image. The processor 270 may reflect the location information, the size information, and the disparity information to a 3D map so as to determine whether any object is located between the vehicle 100 and a POI. The processor 270 may determine as to an overlaid state based on whether the POI is hidden behind a specific object from a point of view of the vehicle 100 in a combined 3D coordinate system into which the 3D map information and the vehicle external image are merged.

When an object is located between the vehicle 100 and a POI, the processor 270 may control the display unit 251 to add graphic effects to the object or a graphic object.

For example, when an object is located between the vehicle 100 and a POI, the processor 270 may control the display unit 251 to add transparency to the object.

In another example, when an object is located between the vehicle 100 and a POI, the processor 270 may control the display unit 251 to remove the object.

In this manner, a user may be able to notice a POI that is located behind an object from a point of view of the vehicle 100.

For example, when an object is located between the vehicle 100 and a POI, the processor 270 may control the display unit 251 to add animation effects to a graphic object. For example, when an object is located between the vehicle 100 and a POI, the processor 270 may control the display unit 251 so that that a graphic object gradually moves from a first point to a second point over time in a vehicle external image. The second point may be closer to the first area corresponding to the POI than the first point.

As animation effects are applied to the graphic object, a user of the vehicle 100 may be able to recognize that the POI is hidden behind the object.

In another example, when a graphic object is displayed in an area corresponding to a different object, the processor 270 may control the display unit 251 to add transparency to the graphic object.

As such, by adding transparency to the graphic object, it is possible not just to display the graphic object, but to make the different object look realistic, so that the user of the vehicle 100 may be provided with a realistic image.

In yet another example, when an object is located between the vehicle and a POI, the processor 270 may control the display unit 251 to further display a top-view image.

The processor 270 may acquire a top-view image stored in a web-server via the interface 245 and the communication device 400. The top-view image may be a previous or real-time image captured by a satellite or an aircraft.

The processor 270 may acquire a top-view image from the navigation system 770.

The processor 270 may control the display unit 251 to highlight an area corresponding to a POI in the top-view image.

In this manner, when a POI is hidden behind an object, a user may be able to correctly recognize a location relationship of locations of the vehicle, the POI, and the object in a top-view image, and therefore, recognize driving environment.

when an object is located between the vehicle 100 and a POI, the processor 270 may acquire an image acquired by a different vehicle located in the vicinity of the POI. The image may be an image of an area surrounding the POI, which is received from a different vehicle located in the vicinity of the POI.

The processor 270 may control the display unit 270 to display, from a point of view of the vehicle 100, the image acquired by the different vehicle. For example, the processor 270 may perform graphics processing on the image acquired by the different vehicle so as to make a user to feel as if the image is captured by the vehicle 100.

Meanwhile, when an object is located between the vehicle 100 and a POI, the processor 270 may receive an image acquired by a structure located in the vicinity of the POI. The image acquired by the structure may be an image acquired from a structure to which a camera for collecting traffic information is attached, or may be an image acquired from a structure to which a security camera is attached.

Meanwhile, the processor 270 may perform an authorization verification procedure to acquire an image acquired by a different vehicle or a structure.

Meanwhile, the processor 270 may receive a plurality of images from a plurality of different vehicles located in the vicinity of a POI. The processor 270 may generate a 3D map by performing 3D modeling on the plurality of images. The processor 270 may show the vehicle 100, the POI, and objects on the generated 3D map. The processor 270 may display the 3D map composited with a vehicle external image.

When an object is located between the vehicle 100 and a POI, the processor 270 may control the display unit 251 to display an image of simulation of driving from a location of the vehicle 100 to the POI.

The driving simulation image may be based on an image stored in a web-server. The processor 270 may acquire a road image stored in the web-server via the interface 145 and the communication device 400. The road image may be a plurality of images capturing a road running from a location of the vehicle 100 to a POI or an area surrounding the road. The processor 270 may display a driving simulation image by continuously displaying the plurality of images.

The processor 270 may control the display unit 251 to display a graphic object in an area not corresponding to an object in a vehicle external image.

In this manner, it is possible to display the graphic object in an area which does not cause confusion to a user.

When a graphic object is displayed in an area corresponding to a different object in a vehicle external image, the processor 270 may control the display unit 251 to add transparency to the different object.

When a graphic object is displayed in an area corresponding to a different object in a vehicle external image, the processor 270 may control the display unit 251 to remove at least part of the different object.

In this manner, it is possible to display a graphic object in a manner that allows a user to recognize the graphic object, even in a case where a vehicle external image filled with objects is acquired—for example, when a vehicle is driving in a tunnel.

Under control of the processor 270, the power supply unit 290 may supply power required for operation of each unit. In particular, the power supply unit 290 may be supplied with power from a battery inside the vehicle 100.

Figure 8B:
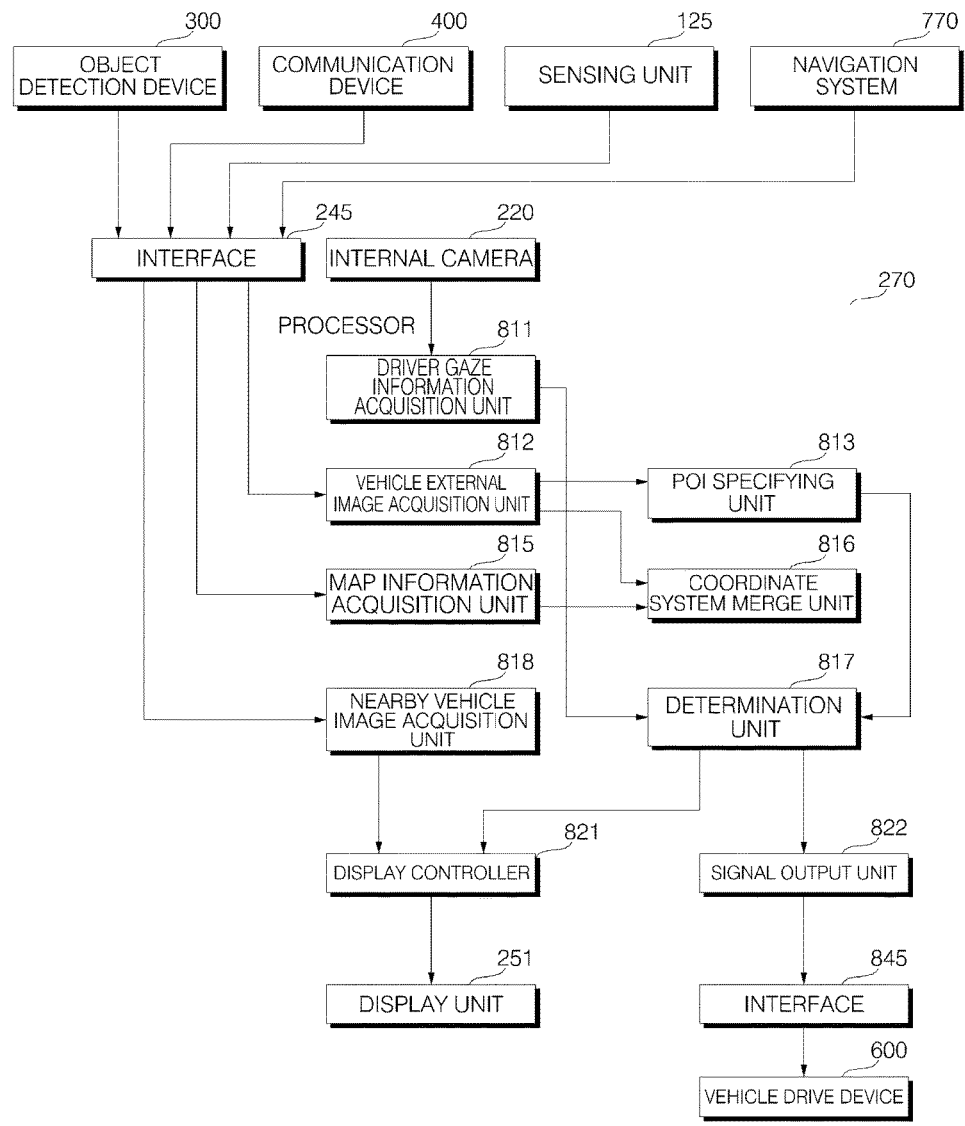
FIG. 8B is a block diagram illustrating a configuration of a processor shown in FIG. 8A.

FIG. 8B is a block diagram illustrating a configuration of the processor shown in FIG. 8A.

Referring to FIG. 8B, the processor 270 may include a driver gaze information acquisition unit 811, a vehicle external image acquisition unit 812, a POI specifying unit 813, a map information acquisition unit 815, a coordinate system merge unit 816, a determination unit 817, a nearby vehicle image acquisition unit 818, a display controller 821, and a signal output unit 822.

The driver gaze information acquisition unit 811 may acquire driver gaze information from the internal camera 220. the driver gaze information acquisition unit 811 may detect a driver's eye from a vehicle internal image acquired by the internal camera 220. The driver gaze information acquisition unit 811 may acquire the driver gaze information based on an image of the driver's eye. the driver gaze information may be provided to the determiner 817.

The vehicle external image acquisition unit 812 may acquire vehicle external image data from the object detection device 300 via the interface 245. The vehicle external image data may be provided to the POI specifying unit 813 and the coordinate system merge unit 816.

The POI specifying unit 813 may receive vehicle external image data from the vehicle external image acquisition unit 812. The POI specifying unit 813 may specify a first area corresponding to a preset POI in a vehicle external image. The POI specifying unit 813 may constantly track the specified first area.

The map information acquisition unit 815 may acquire 3D map information from the navigation system 770 via the interface 245. The 3D map information may be provided to the coordinate system merge unit 816.

The coordinate system merge unit 816 may merge a coordinate system of the 3D map information and a coordinate system of the vehicle external image into a 2D or 3D coordinate system.

The 3D map information is based on a 3D coordinate system. The vehicle external image is based on a 2D coordinate system.

For example, the coordinate system merge unit 816 may convert 3D map information into 2D map information. The coordinate system merge unit 816 may merge the 3D map information and a vehicle external image into a 2D coordinate system by applying the 2D map information to the vehicle external image.

In another example, the coordinate system merge unit 816 may receive location information, size information, and disparity information of a plurality of objects included in a vehicle external image. The coordinate system merge unit 816 may merge 3D map information and the vehicle external image into a 3D coordinate system by applying the location information, the size information, and the disparity information of the plurality of objects to the 3D map information.

The determination unit 817 may determine whether a POI is overlaid with an object in a coordinate system combined by the coordinate system merge unit 816.

The determination unit 817 may determine whether any object is located between the vehicle 100 and the POI.

The determination unit 817 may determine whether the POI is hidden behind an object from a point of view of the vehicle 100.

The determination unit 817 may determine as to an overlaid state based on whether the POI is overlaid with a specific object at any pixel in a combined 2D coordinate system into which 3D map information and a vehicle external image are merged.

The determination unit 817 may determine as to an overlaid state based on whether the POI is hidden behind a specific object from a point of view of the vehicle 100 in a combined 3D coordinate system into which 3D map information and a vehicle external image are merged.

In the above, the object may indicate any object other than the vehicle 100 and the POI in the vehicle external image. For example, the object may be a nearby vehicle. In another example, the object may be a structure such as a streetlight, a roadside tree, a building, a traffic light, and a bridge. In yet another example, the object may be a geographical feature such as a mountain and a hill.

The determination unit 817 may provide a result of the determination to the display controller 821 and the signal output unit 822.

The nearby vehicle image acquisition unit 818 may acquire an image from a nearby vehicle via the interface 245 and the communication device 400. The image may be an image of an area surrounding a POI, which is received from a different vehicle located in the vicinity of the POI.

The display controller 821 may control the display unit 251.

The display controller 821 may control the display unit 251 to display a graphic object of augmented reality on a vehicle external image to point out a first area corresponding to a POI.

The display controller 821 may control the display unit 251 to display a graphic object along a travel lane to point out the first area corresponding to the POI.

When the first area is located on the left side of the travel lane in the vehicle external image, the display controller 821 may control the display unit 251 to display the graphic object on the right side of the first area.

When the first area is located on the right side of the travel lane in the vehicle external image, the display controller 821 may control the display unit 251 to display the graphic object on the left side of the first area.

The display controller 821 may control the display unit 251 to display the graphic object from a point of view of the vehicle 100 to point out a portion of the first image in which a building shape is positioned.

The display controller 821 may control the display unit 251 to display the graphic object in an area not corresponding to a different object in the vehicle external image.

When the graphic object is displayed in an area corresponding to a different object in the vehicle external image, the display controller 821 may control the display unit 251 to add transparency to the different object.

When the graphic object is displayed in an area corresponding to a different object in the vehicle external image, the display controller 821 may control the display unit 251 to remove at least part of the different object.

The display controller 821 may control the display unit 251 based on a result of determination made by the determination unit 817.

When an object is located between the vehicle 100 and a POI, the display controller 821 may control the display unit 251 to add transparency to the object.

When an object is located between the vehicle 100 and a POI, the display controller 821 may control the display unit 251 to remove the object.

When an object is located between the vehicle 100 and a POI, the display controller 821 may control the display unit 251 to gradually move a graphic object over time from a first point to a second point in a vehicle external image.

When a graphic object is displayed in an area corresponding to a different object, the display controller 821 may control the display unit 251 to add transparency to the graphic object.

When an object is located between the vehicle 100 and a POI, the display controller 821 may control the display unit 251 to further display a top-view image.

The display controller 821 may control the display unit 251 to highlight an area corresponding to the POI in the top-view image.

When an object is located between the vehicle 100 and a POI, the display controller 821 may control the display unit 251 to display, from a point of view of the vehicle 100, an image acquired by a different vehicle.

When an object is located between the vehicle 100 and a POI, the display controller 821 may control the display unit 251 to display an image of simulation of driving from a location of the vehicle 100 to the POI.

Based on a result of determination, the signal output unit 822 may provide a signal to control at least one of a power source, a brake apparatus, and a steering apparatus.

The signal output unit 822 may provide a signal to the vehicle drive device 600 via the interface 245.

Figure 9:
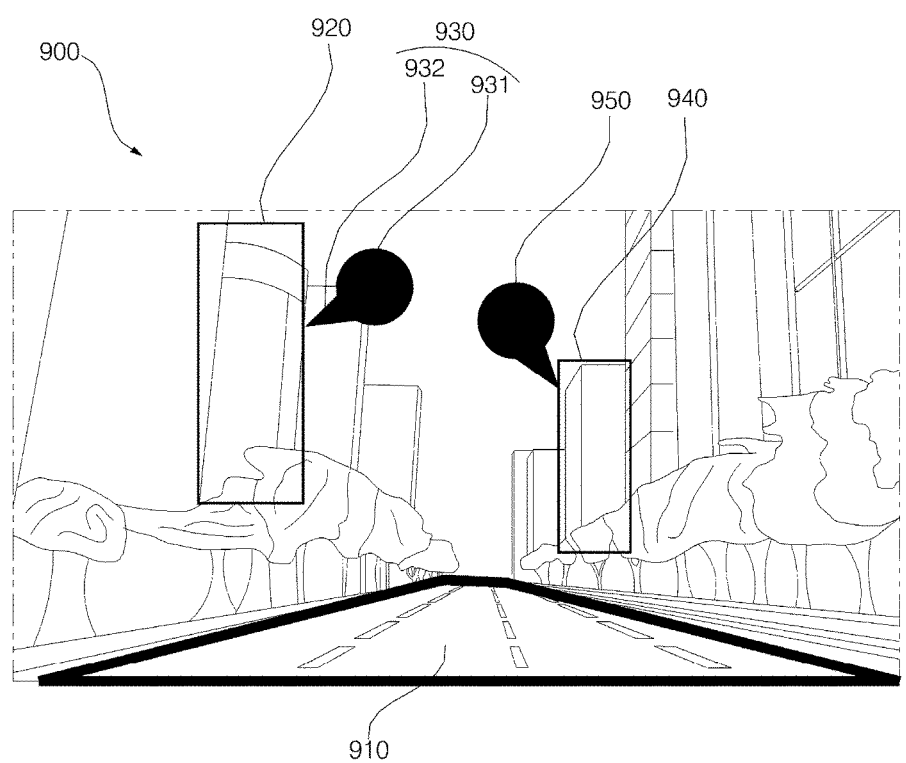
FIG. 9 is a diagram illustrating how to display a graphic object according to an embodiment of the present invention.

FIG. 9 is a diagram for explanation of how to display a graphic object according to an embodiment of the present invention.

Figure 10:
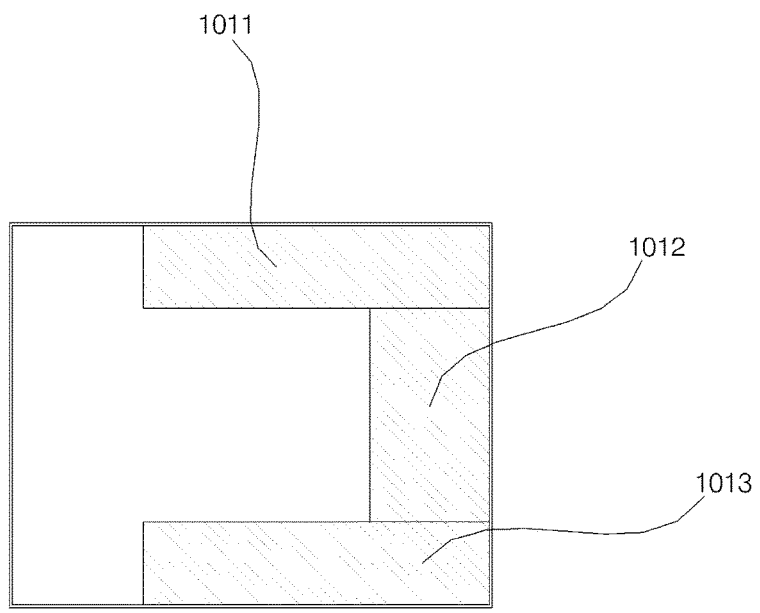
FIG. 10 is a diagram for explanation of a display area of a graphic object according to an embodiment of the present invention.
Figure 10:
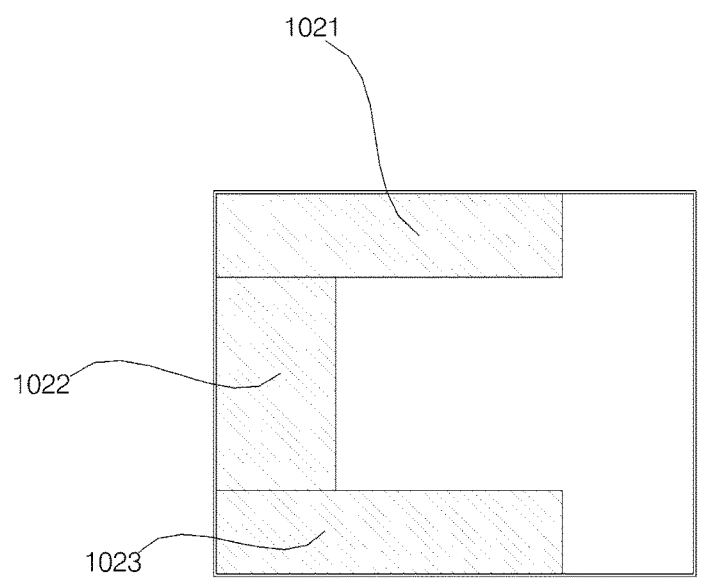

FIG. 10 is a diagram for explanation of a desirable display area of a graphic object according to an embodiment of the present invention.

Referring to FIGS. 9 and 10, the processor 270 may receive a vehicle external image via the interface 245. For example, the vehicle external image may be an image of a scene forward of the vehicle 100.

During travelling of the vehicle 100, the camera 310 may constantly capture an image of an area surrounding the vehicle 100. The processor 270 may constantly receive a vehicle external image via the interface 245.

In FIG. 9, reference numeral 900 indicates a still image taken as a vehicle external image.

The processor 270 may specify first areas 920 and 940 corresponding to preset POIs in the vehicle external image 900.

The first areas 920 and 940 may indicate the POIs in the vehicle external image 900.

For example, when a first building is set as a destination and therefore pre-defined as a POI, the processor 270 may specify the area 920, corresponding to the first building in the vehicle external image 900, as a first area.

In another example, when a second building is set as a waypoint and therefore pre-defined as a POI, the processor 270 may specify the area 940, corresponding to the second building in the vehicle external image 900, as a second area.

The processor 270 may control the display unit 251 to display graphic objects 930 and 950 of augmented reality on the vehicle external image 900 to point out the first area.

The graphic object 930 may include a body part 931 and a tail part 932.

The body part 931 may be an area in which information on a POI is displayed. The processor 270 may control the display unit 251 to display text related to the POI in the body part 931.

The tail part 932 may be an area which points out the first area 920.

The processor 270 may control the display unit 251 to display the graphic objects 930 and 950 along a travel lane 910 to point out a first area corresponding to a POI.

When the first area 920 is located on the left side of the travel lane 910 in a vehicle external image, the processor 270 may control the display unit 251 to display the graphic object 930 on the right side of the first area 920.

For example, the processor 270 may display the graphic object 930 on the right side of the first area 920 in the vehicle external image. That is, the processor 270 may display the graphic object 930 in at least one of the following areas: an area 1011 in which the sky is displayed, an area 1012 which is on the right side of the travel lane 910, and an area 1013 in which a road is displayed.

When the first area 940 is located on the right side of the travel lane 910 in a vehicle external image, the processor 270 may control the display unit 251 to display the graphic object 950 on the left side of the first area.

For example, the processor 270 may display the graphic object 950 on the left side of the first area 940 in the vehicle external image 900. That is, the processor 270 may display the graphic object 950 in at least one of the following areas: an area 1021 in which the sky is displayed, an area 1022 which is on the left side of the travel lane 910, and an area 1023 in which a road is displayed.

Figure 11:
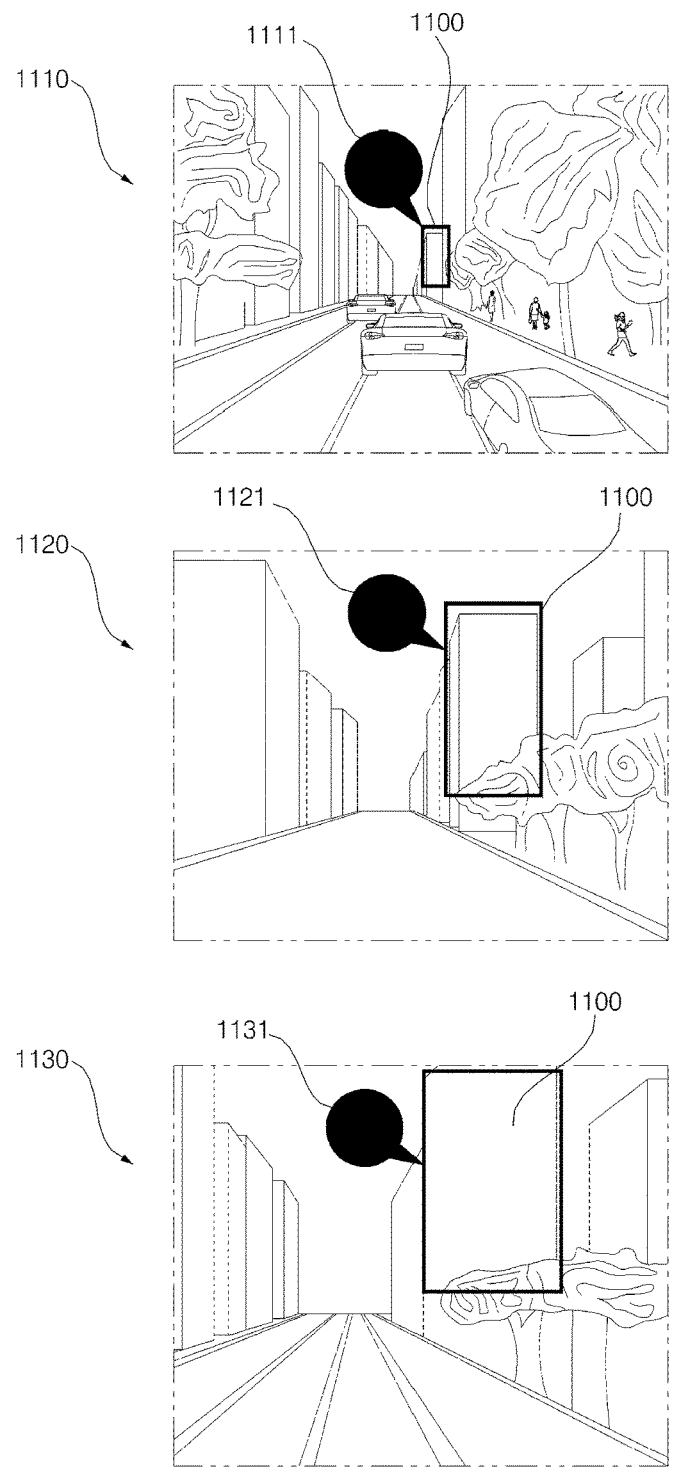
FIG. 11 is a diagram for explanation of a portion of a first area to be pointed out based on distance between a vehicle and a Point of Interest (POI) according to an embodiment of the present invention.

FIG. 11 is a diagram for explanation of a portion of the first area to be pointed out, based on distance between a vehicle and a POI, according to an embodiment of the present invention.

Referring to FIG. 11, the processor 270 may receive information on distance between the vehicle 100 and a POI from the object detection device 300 or the navigation system 770 via the interface 245.

Based on the distance between the vehicle 100 and the POI, the processor 270 may determine a portion of the first area to be pointed out by a graphic object.

The processor 270 may determine the portion of the first area to be pointed out based on one section from among a plurality of preset sections, to which the distance between the vehicle 100 and the POI corresponds.

Meanwhile, the more closely the vehicle 100 approaches a POI, the bigger the first area corresponding to the POI may increasingly may appear in a vehicle external image.

Based on the change in size of the first area, the processor 270 may change a portion of the first area to be pointed out by a graphic object 1111, 1121, or 1131.

For example, when the distance between the vehicle 100 and the POI corresponds to long distance, as shown in 1110, the processor 270 may control the display unit 251 to display the graphic object 1111 to point out the upper portion of a first area 1100. The long distance indicates 500 m or more between the vehicle 100 and the POI.

In another example, when the distance between the vehicle 100 and the POI corresponds to medium distance, as shown in 1120, the processor 270 may control the display unit 251 to display the graphic object 1121 to point out the left upper portion of the first area 1100. The medium distance indicates 200 m to 500 m between the vehicle 100 and the POI.

In yet another example, when the distance between the vehicle 100 and the POI corresponds to short distance, as shown in 1130, the processor 270 may control the display unit 251 to display the graphic object 1130 to point out the left middle portion of the first area 1100. The short distance indicates 50 m or less between the vehicle 100 and the POI.

Figure 12:
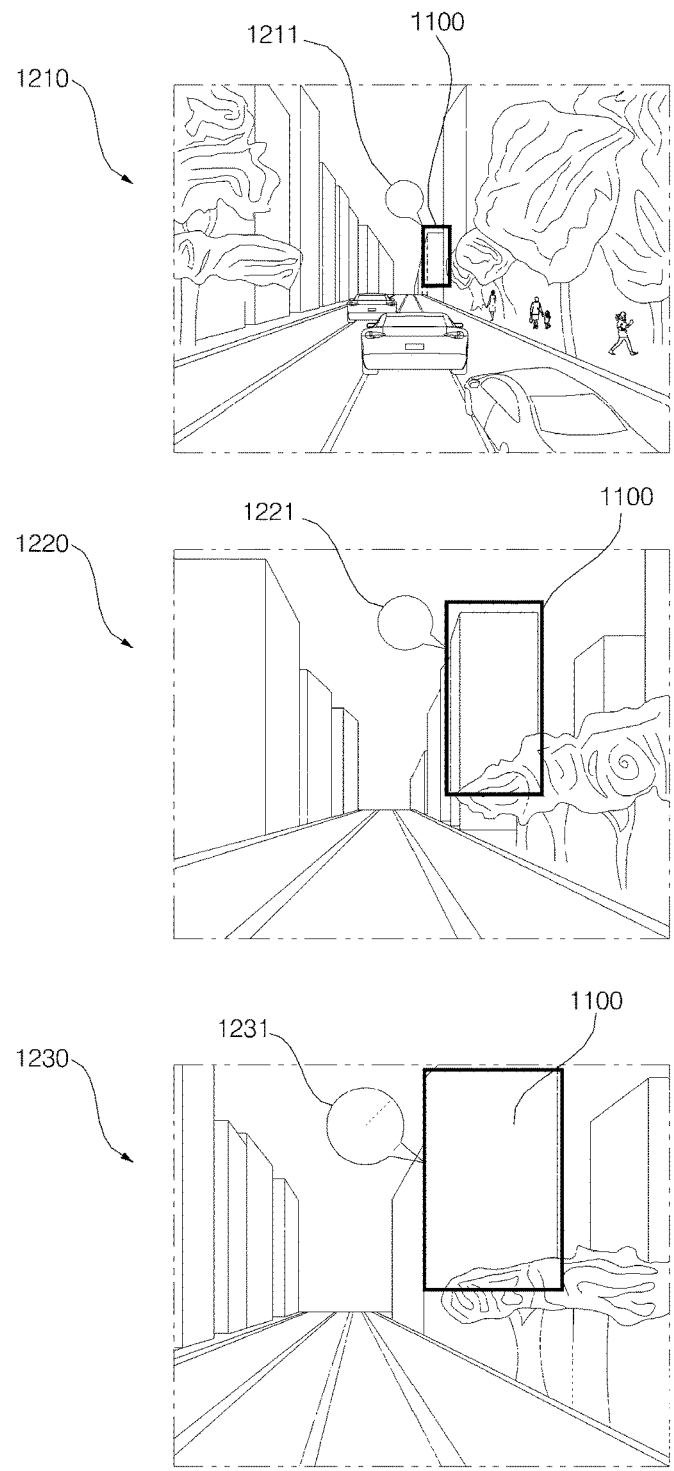
FIG. 12 is a diagram for explanation of transparency of a graphic object based on distance between a vehicle and a POI according to an embodiment of the present invention.

FIG. 12 is a diagram for explanation of transparency of a graphic object based on distance between a vehicle and a POI according to an embodiment of the present invention.

Referring to FIG. 12, the processor 270 may receive information on distance between the vehicle 100 and a POI from the object detection device 300 or the navigation system 770 via the interface 245.

The processor 270 may determine at least one of color, size, and a transparency level of a graphic object based on the distance between the vehicle 100 and the POI.

The processor 270 may determine at least one of color, size, and a transparency level of a graphic object based on one section from among a plurality of preset sections, to which the distance between the vehicle 100 and the POI corresponds.

Meanwhile, the more closely the vehicle 100 approaches the POI, the bigger a first area corresponding to the POI may appear in a vehicle external image.

Based on the change in size of the first area, the processor 270 may change size or a transparency level of a graphic object 1211, 1221, or 1231.

For example, when the distance between the vehicle 100 and the POI corresponds to long distance, as shown in 1210, the processor 270 may control the display unit 251 to display the graphic object 1211 with first color, first size, or first transparency level. The long distance indicates 500 m or more between the vehicle 100 and the POI.

In another example, when the distance between the vehicle 100 and the POI corresponds to medium distance, as shown in 1220, the processor 270 may control the display unit 251 to the graphic object 1221 with second color, second size, or second transparency level. The medium distance indicates 200 m to 500 m between the vehicle 100 and the POI.

In yet another example, when the distance between the vehicle 100 and the POI corresponds to short distance, as shown in 1230, the processor 270 may control the display unit 251 to the graphic object 1231 with third color, third size, or third transparency level. The short distance indicates 50 m or less between the vehicle 100 and the POI.

Figure 13:
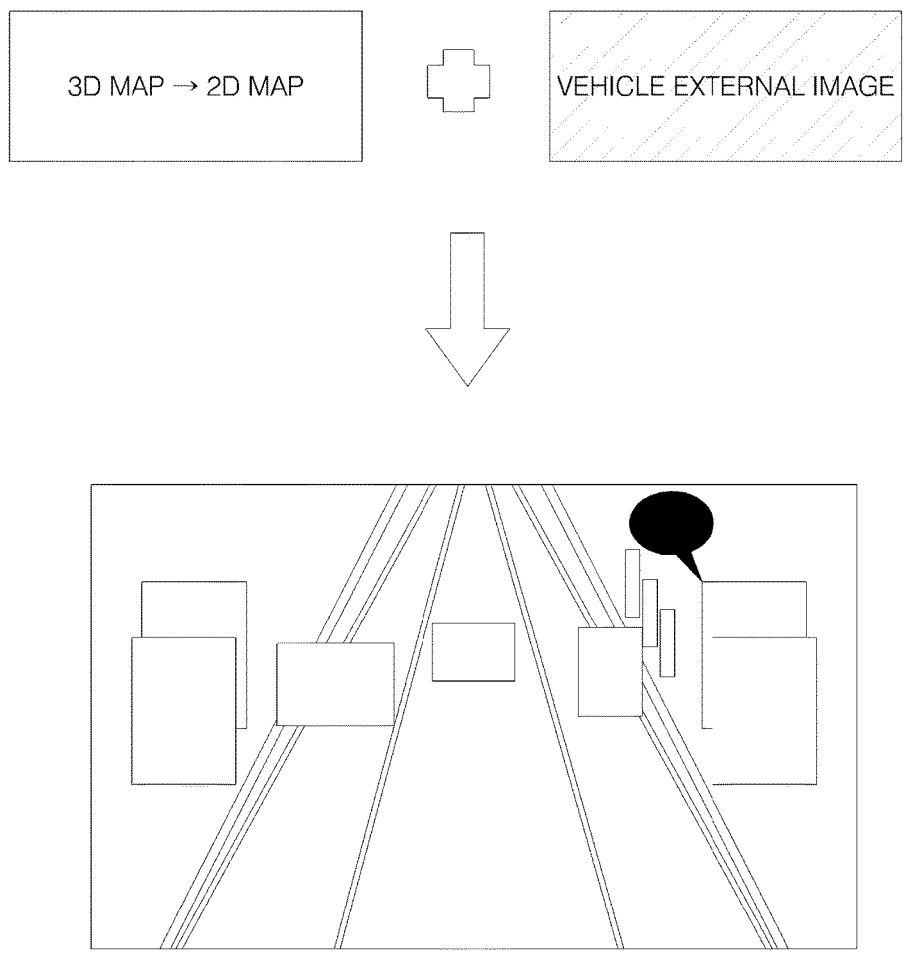
FIG. 13 is a diagram for explanation of how to determine as to an overlaid state based on a 2D coordinate system according to an embodiment of the present invention.

FIG. 13 is a diagram for explanation of how to determine as to an overlaid state based on a 2D coordinate system according to an embodiment of the present invention.

Referring to FIG. 13, the processor 270 may acquire 3D map information and a vehicle external image. The 3D map information is based on a 3D coordinate system. The vehicle external image is based on a 2D coordinate system.

The processor 270 may convert the 3D map information into 2D map information. The processor 270 may merge the 3D map information and the vehicle external information into a 2D coordinate system by applying the 2D map information to the vehicle external image.

The processor 270 may compare a 2D map with the vehicle external image to determine whether any object is located between the vehicle 100 and the POI in the combined 2D coordinate system.

For example, the processor 270 may determine as to an overlaid state based on whether a POI is overlaid with a specific object at any pixel.

Figure 14:
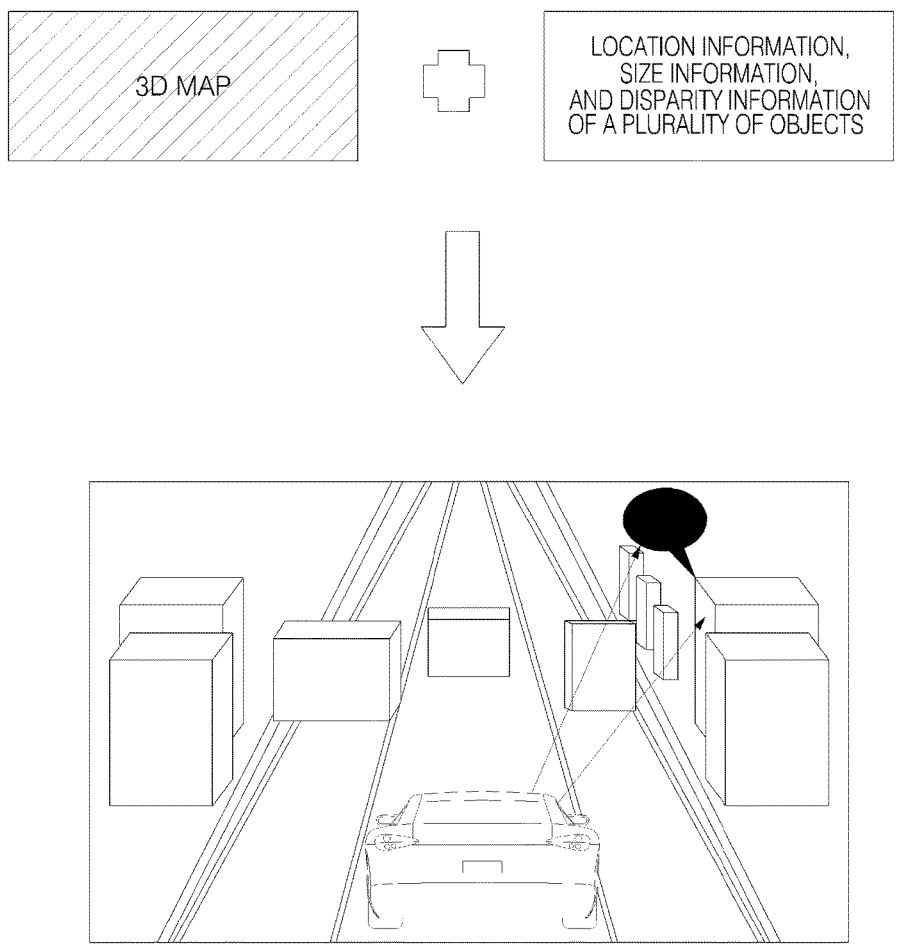
FIG. 14 is a diagram for explanation of how to determine as to an overlaid state based on a three-dimensional (3D) coordinate system according to an embodiment of the present invention.

FIG. 14 is a diagram for explanation of how to determine as to an overlaid state based on a 3D coordinate system according to an embodiment of the present invention.

Referring to FIG. 14, the processor 270 may acquire 3D map information and a vehicle external image. The processor 270 may receive location information, size information, and disparity information of a plurality of objects included in the vehicle external image.

The 3D map information is based on a 3D coordinate system. The vehicle external image is based on a 2D coordinate system.

The processor 270 may merge the 3D map information and the vehicle external image into a 3D coordinate system by applying the location information, the size information, and the disparity information of the plurality of objects to the 3D map information.

Given the combined 3D coordinate system, the processor 270 may reflect the location information, the size information, and the disparity information to a 3D map so as to determine whether any object is located between the vehicle 100 and the POI.

For example, the processor 270 may determine as to an overlaid state based on whether a POI is hidden behind a specific object from a point of view of the vehicle 100.

Figure 15:
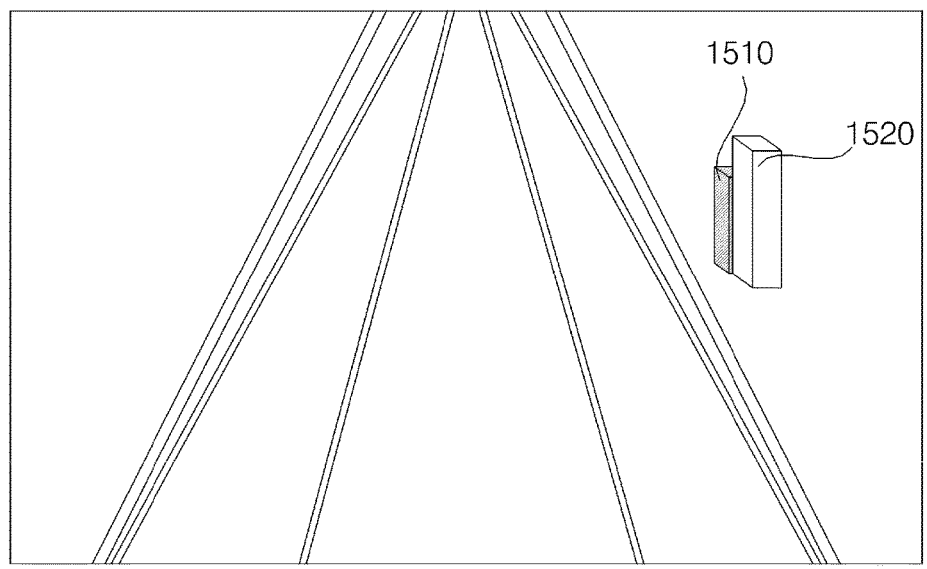
FIGS. 15 to 17 are diagrams for explanation of how to add graphic effects in response to determination of an overlaid state according to an embodiment of the present invention.
Figure 16:
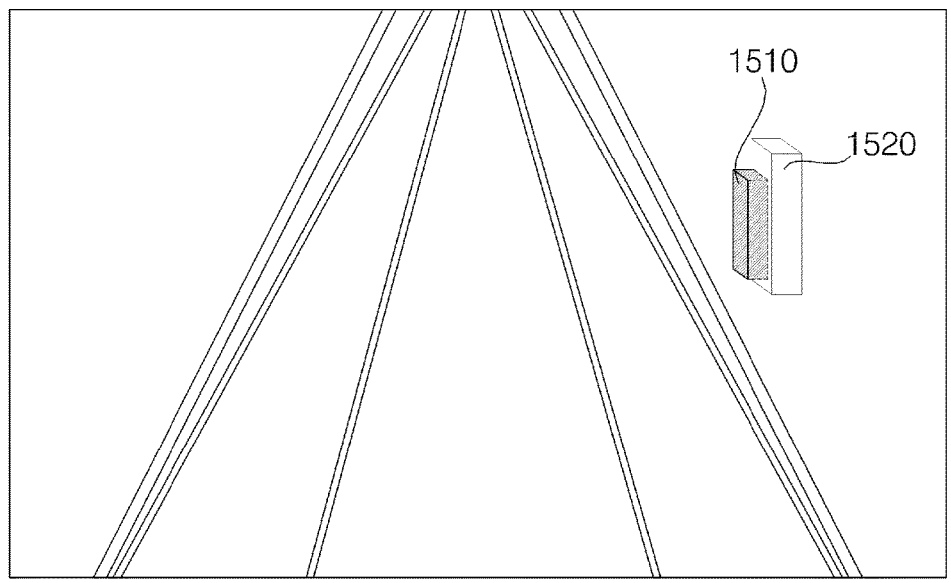
Figure 17:
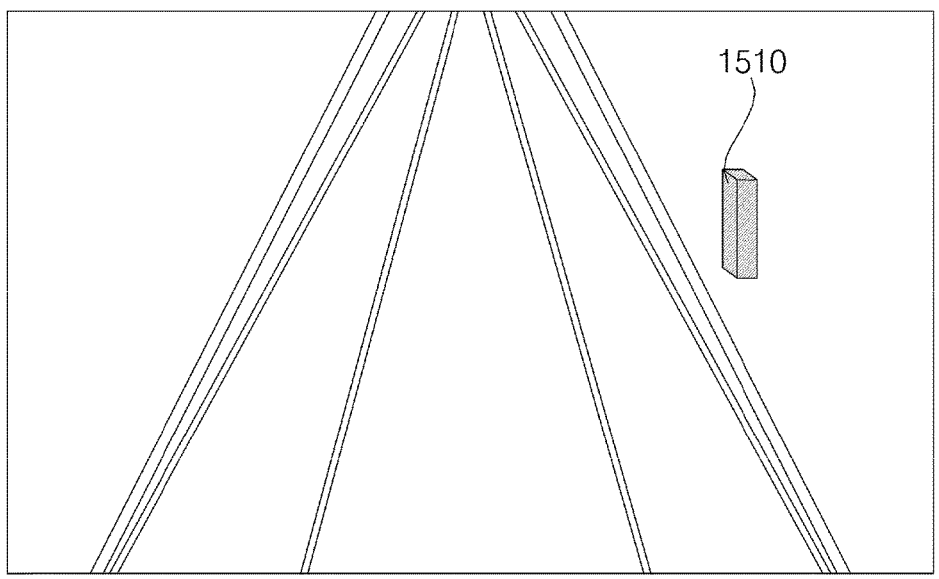

FIGS. 15 to 17 are diagrams for explanation of how to add graphic effects in response to determination of an overlaid state according to an embodiment of the present invention.

As illustrated in FIG. 15, an object 1520 may be located between a vehicle 100 and a POI 1510.

In this case, the processor 270 may determine as to whether the POI 1510 is overlaid by the object 1520.

In response to determination that the POI 1510 is overlaid by the object 1520, the processor 270 may control the display unit 251 to add transparency to the object 1520, as shown in FIG. 16.

In response to determination that the POI 1510 is overlaid by the different object 1520, the processor 270 may control the display unit 251 to remove the object 1520, as shown in FIG. 17.

In this manner, a user may be able to notice and recognize a POI that is located behind an object from a point of view of the vehicle 100.

Figure 18:
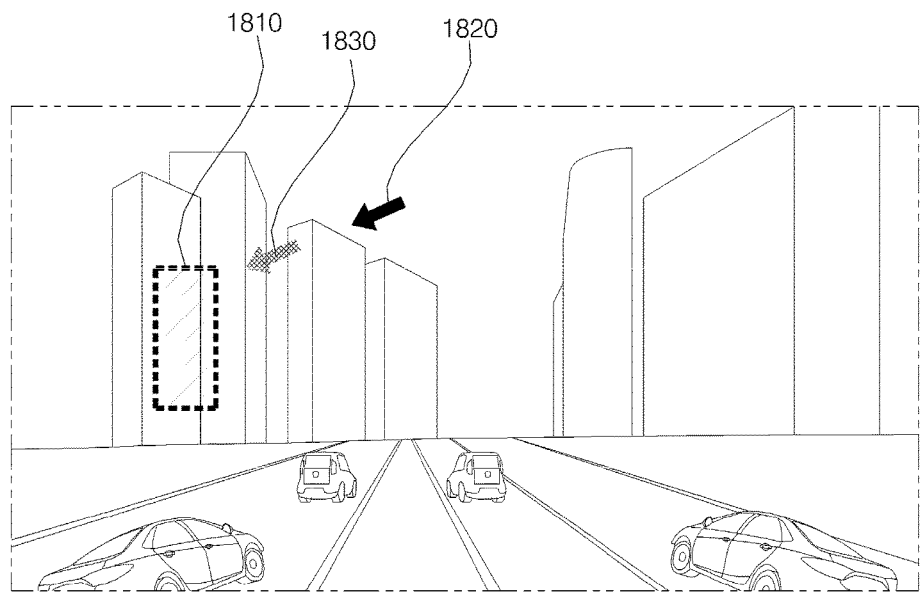
FIG. 18 is a diagram for explanation of how to apply animation effects in response to determination of an overlaid state according to an embodiment of the present invention.

FIG. 18 is a diagram for explanation of how to apply animation effects in response to determination of an overlaid state according to an embodiment of the present invention.

Referring to FIG. 18, in response to determination that a POI is overlaid by an object, the processor 270 may control the display unit 251 to add animation effects to graphic objects 1820 and 1830.

As illustrated in FIG. 18, an object may be located between a vehicle 100 and a POI 1810, and thus, the POI 1810 may not be seen from the vehicle 100.

In this case, the processor 270 may control the display unit 251 to gradually move the graphic objects 1820 and 1830 over time from a first point 1820 to a second point 1830 over time.

The second point 1830 in a vehicle external image may be a point which is closer to a first area corresponding to the POI than the first point 1820.

Meanwhile, in some embodiments, the processor 270 may change a moving speed of the graphic objects 1820 and 1830 based on a distance between the vehicle 100 and the POI.

If the vehicle 100 becomes closer to the POI, the processor 270 may make the graphic objects 1820 and 1830 to move faster gradually.

If the vehicle 100 becomes father from the POI, the processor 270 may make the graphic objects 1820 and 1830 to move slower gradually.

As such, the moving speed of the graphic objects 1820 and 1830 are changed based on a distance between the vehicle 100 and a POI, so a user may be able to intuitively recognize the distance between the vehicle 100 and the POI.

Figure 19:
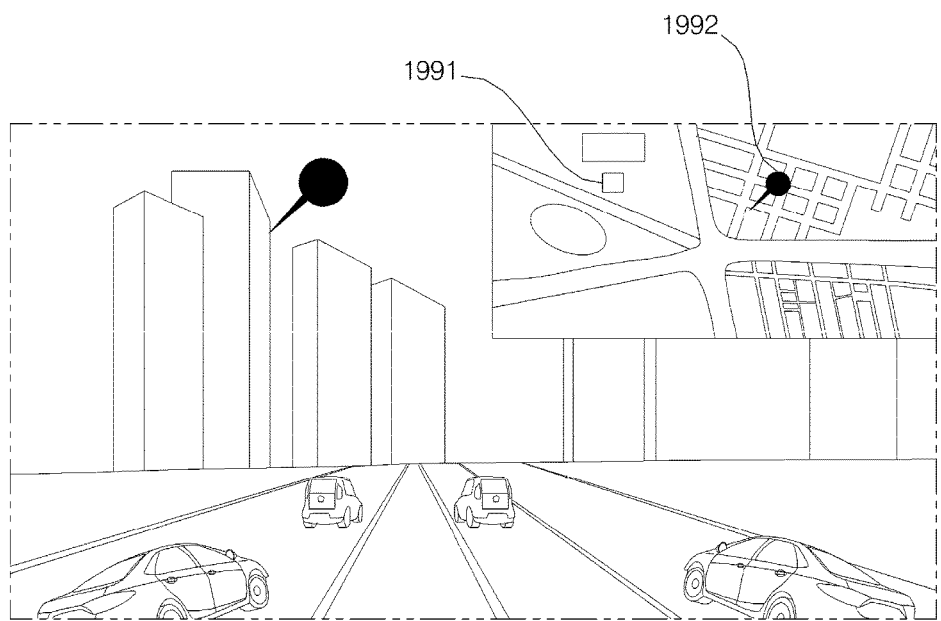
FIG. 19 is a diagram for explanation of how to display a top-view image in response to determination of an overlaid state according to an embodiment of the present invention.

FIG. 19 is a diagram for explanation of how to display a top-view image in response to determination of an overlaid state according to an embodiment of the present invention.

Referring to FIG. 19, the processor 270 may control the display unit 251 to further display a top-view image 1991 in response to determination that a POI is overlaid by an object.

The processor 270 may display a graphic object 1992 to be overlaid on the top-view image 1991.

The processor 270 may control the display unit 251 to highlight an area corresponding to the POI in the top-view image 1991.

Meanwhile, the top-view image 1991 may be displayed in any part of a screen on which a vehicle external image is displayed.

In this manner, when a POI is hidden behind an object, a user may be able to correctly recognize a location relationship of the POI, the object, and a vehicle in a top-view image, and therefore, recognize driving environment.

Figure 20:
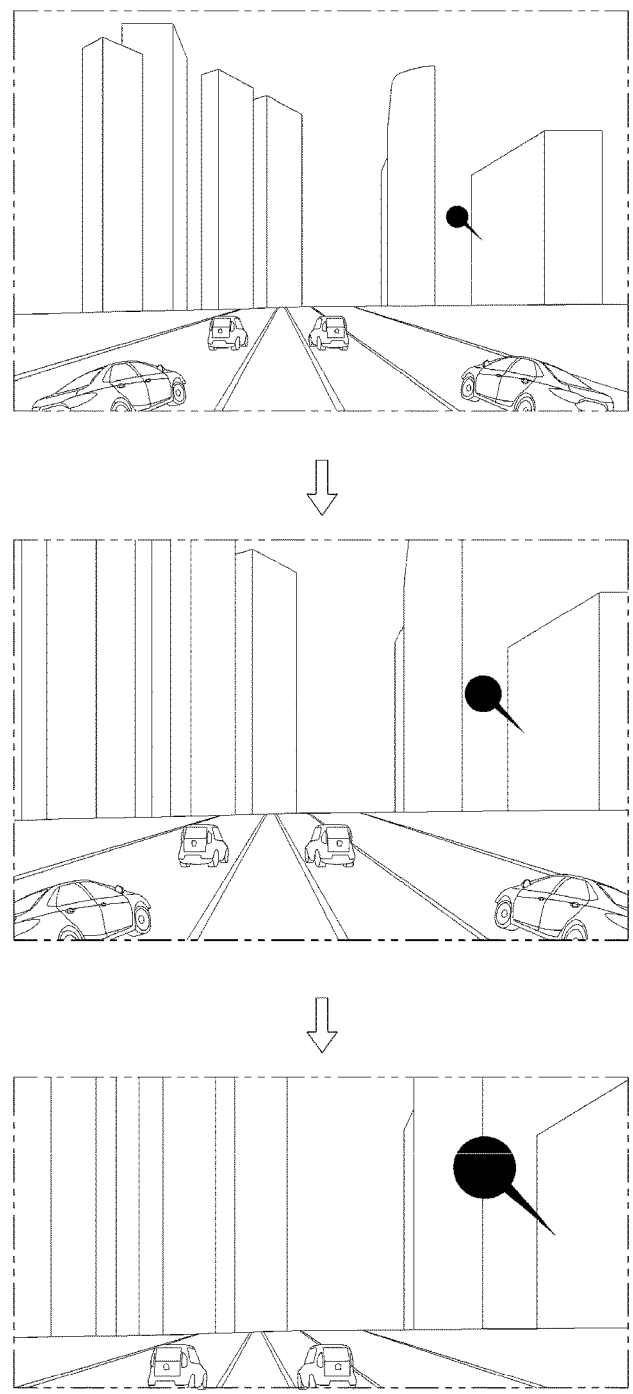
FIG. 20 is a diagram for explanation of how to display a driving simulation image in response to determination of an overlaid state according to an embodiment of the present invention.

FIG. 20 is a diagram for explanation of how to display a driving simulation image in response to determination of an overlaid state according to an embodiment of the present invention.

Referring to FIG. 20, in response to determination that a POI is overlaid with an object, the processor 270 may control the display unit 251 to display an image of simulation of driving from a location of the vehicle 100 and to the POI.

The processor 270 may acquire, from a web server via the interface 245 and the communication device 400, a road image of a road from the location of the vehicle 100 to the POI. The road image may be a plurality of images capturing a road and an area in surrounding of the road.

The processor 270 may control the display 251 to display road images to be changed over time so that a user may feel like the vehicle 100 is moving.

For example, at a first point in time, the processor 270 may control the display unit 251 to display a first road image when the vehicle 100 is located at a first point.

Then, at a second point in time, the processor 270 may control the display unit 251 to display a second road image when the vehicle 100 is located at a second point.

Then, the processor 270 may control the display unit 251 to display road images available to be displayed over time until the vehicle 100 arrives at the POI.

Figure 21A:
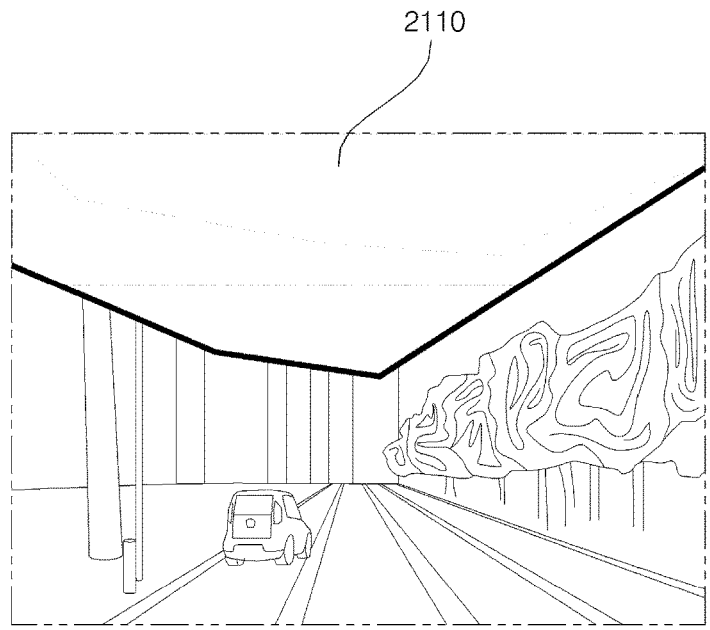
FIGS. 21A and 21B are diagrams for explanation of a display area of a graphic object according to an embodiment of the present invention.
Figure 21A:
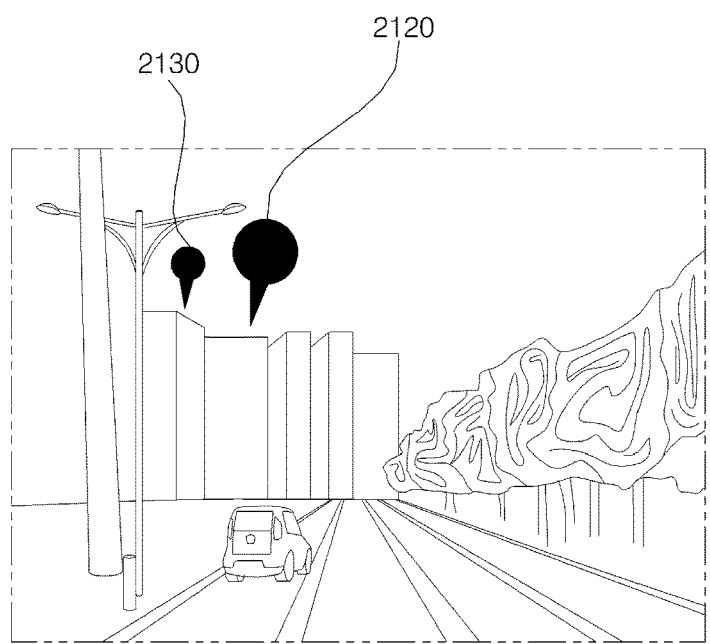

FIG. 21A is a diagram for explanation of a display area of a graphic object according to an embodiment of the present invention.

The processor 270 may control the display unit 251 to display a graphic object in an area 2110 not corresponding to an object in a vehicle external image.

The object may include a lane, a different vehicle, a pedestrian, a two-wheeled vehicle, a traffic signal, a light, a road, a structure, a bump, a geographical feature, an animal, etc.

For example, the processor 270 may control the display unit 251 to display graphic objects 2120 and 2130 in the area 2110 in which the sky is displayed.

A plurality of graphic objects 2120 and 2130 may exist. If there is a plurality of POIs, the processor 270 may display the graphic objects 2120 and 2130 respectively corresponding to the plurality of graphic objects. In this case, the processor 270 may control the display unit 251 to display a first graphic object to look bigger than that of a second graphic object.

The first graphic object may correspond to a first POI. The second graphic object may correspond to a second POI. A first distance between the vehicle 100 and the first POI may be smaller than a second distance between the vehicle 100 and the second POI.

Figure 21B:
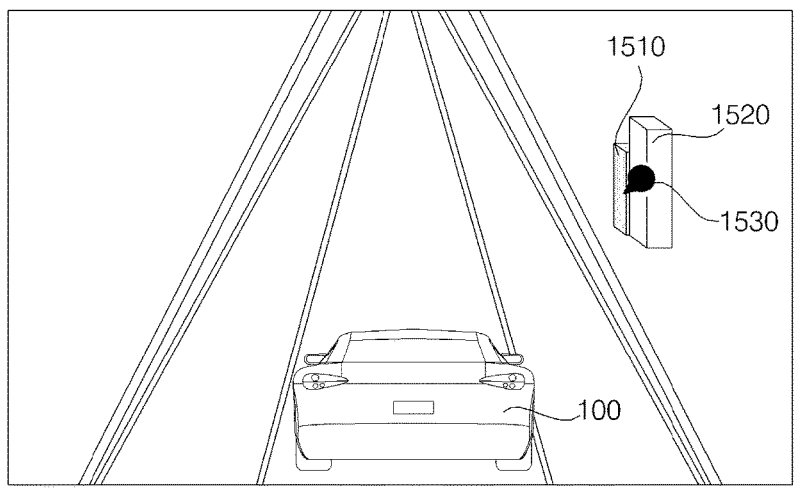
Figure 21B:
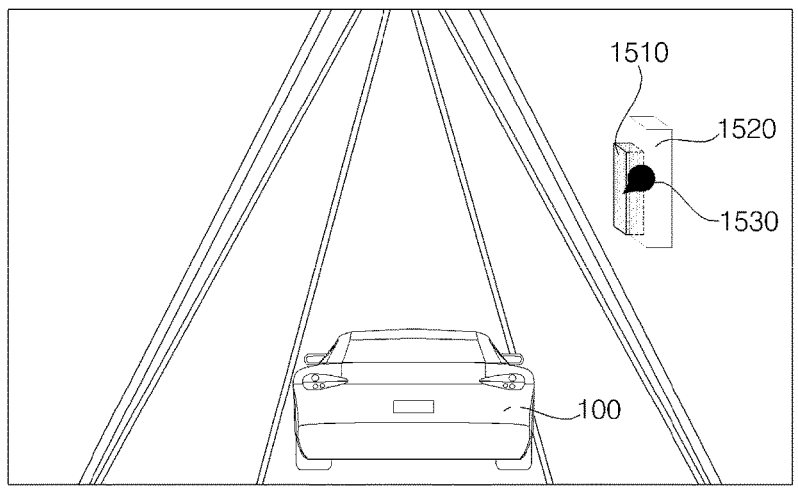

FIG. 21B is a diagram for explanation of how to display a graphic object over a different object according to an embodiment of the present invention.

When a graphic object 1530 is displayed in an area corresponding to a different object 1520 in a vehicle external image, the processor 270 may control the display unit 251 to remove at least part of the different object 1521.

When the graphic object 1530 is displayed in the area corresponding to the different object 1520 in the vehicle external image, the processor 270 may control the display unit 251 to add transparency to the different object 1520.

Figure 22:
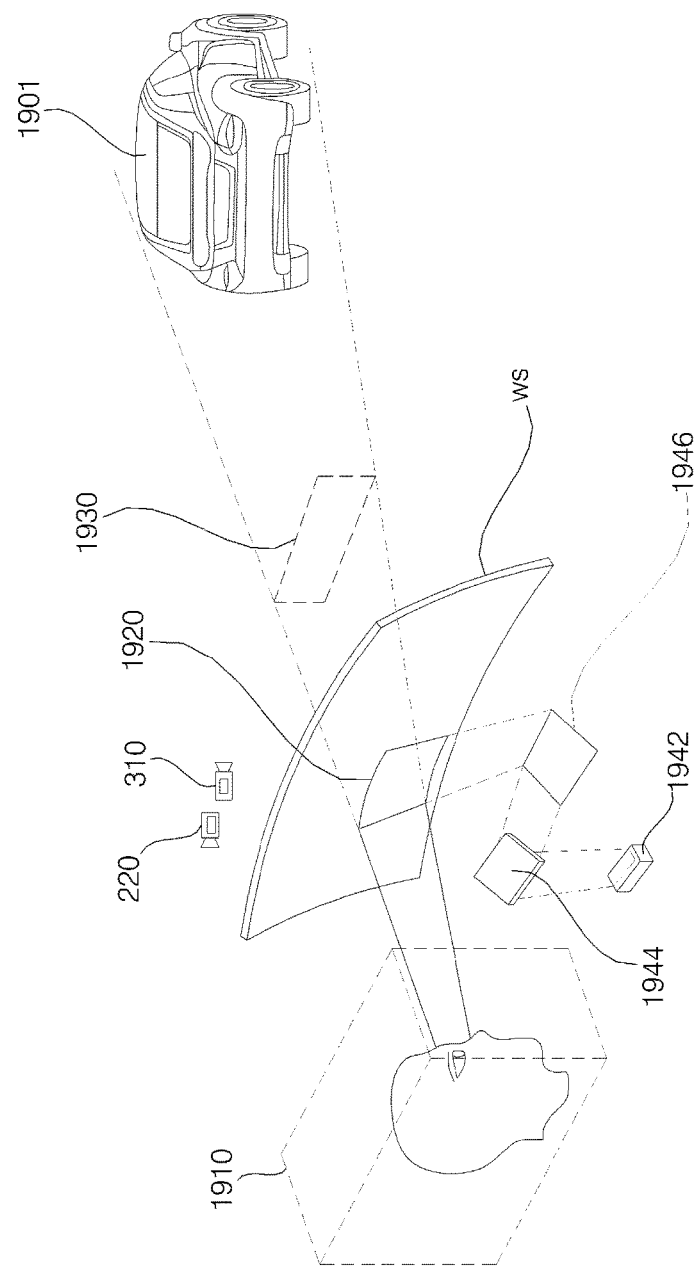
FIG. 22 is a conceptual diagram illustrating how a display unit produces an augmented reality image on a windshield according to an embodiment of the present invention.

FIG. 22 is a conceptual diagram illustrating how a display unit produces an augmented reality image on a windshield according to an embodiment of the present invention.

In FIG. 22, the display 251 is assumed as an HUD.

In the following description, an augmented reality image may be an example of a graphic object.

Referring to FIG. 22, the display unit 251 may include a display panel 1942, a first mirror 1944, and a second mirror 1946.

The display panel 1942 may include a back light unit to project a light onto a windshield (WS) under control of the processor 270 so as to produce an augmented reality image.

The processor 270 may be functionally connected to the internal camera 220, the external camera 310, and the display panel 1942 to generate image data for constructing a specific augmented reality image based on an image provided from the internal camera 220 and/or the external camera 310 and to provide the specific augmented reality image to the display panel 1942. For example, the image data for constructing an augmented reality image may be in a bitmap format.

In one embodiment, the processor 270 may detect a specific object 1901, existing in front of the vehicle 100, from an image of a scene forward of the vehicle 100 provided from the external camera 310. In addition, the processor 270 may provide the display panel 1942 with image data for constructing an augmented reality image corresponding to the detected object 1901.

Based on the image data provided from the processor 270, the display panel 1942 may output the light corresponding to the augmented reality image to the first mirror 1944. The second mirror 1946 may reflect the light reflected from the first mirror 1944 to the wind shield (WS) in order to produce an augmented reality image on the windshield (WS). Along an optical path from the display panel 1942 to the wind shield (WS), size of the light corresponding to the augmented reality image may be enlarged or a location at the windshield (WS) onto which the light is projected may be adjusted.

Meanwhile, the light reflected by the second mirror 1946 may be projected onto a predetermined area (hereinafter, referred to as a display area) of the windshield (WS). A reflective film may be attached onto a display area 1920 in order to make an augmented reality image 1930 to look more clearly.

At this point, the augmented reality image 1930 is produced with the light projected onto the windshield (WS). In this case, from a point of view of a driver, the augmented reality image may be seen as being displayed not within the display area 1920, but beyond the display area 1920 and outside the vehicle 100. That is, the augmented reality image 1930 may be perceived as a virtual image hovering in the air at a predetermined distance ahead of the vehicle 100. For example, the augmented reality image 1930 may be a graphic object which provides information on the boundary of the object 1901, speeds, collision warning, etc.

In a case where the augmented reality image 1930 is produced in the form of a virtual image by the display unit 251, the eyes of the driver should be within an eye box 1910, so that a driver may recognize the augmented reality image 1930 in the display area 1920. The eye box 1910 is a 3D volume space inside the vehicle 100. When the driver's eyes are within the eye box 1910, the driver is able to see the augmented reality image 1930 in the display area 1920. However, when the driver's eyes are out of the eye box 1910, the driver is able to see only part of the augmented reality image 1930 or not able to see the augmented reality image 1930 at all. Coordinate values defining the boundary of the eye box 1910 may be stored in the memory 240 in advance.

Meanwhile, although the driver is able to recognize the augmented reality image 1930 when the driver's eyes are within the eye box 1910, there may be a difference between a real image of the object 1901 and the augmented reality image 1930 recognized by the driver from the display area 1920 as a location of the driver's eyes is changed within the eye box 1910. This difference is made because distance to the augmented reality image 1930 and distance to the object 1901 are different with reference to a location of the driver. Such difference may become greater when the object 1901 is relatively farther from the driver. To reduce or resolve the difference, the processor 270 may perform post-processing on the augmented reality image 1930 based on a location of the driver's eyes.

Specifically, the processor 270 may detect the location of eyes of the driver from a driver image provided from the internal camera 220. In one embodiment, the processor 270 may detect the driver's eyes from a driver image using eye tracking technology, and calculate 3D coordinates of the detected eyes. In another embodiment, the processor 270 may extract the boundary of the driver's face using edge detection technology, and estimate a location of the driver's eyes based on the extracted boundary.

Information on a reference location may be set in the memory 240 in advance, and the processor 270 may compare the location of the driver's eyes with the reference location to thereby calculate the direction and distance of the driver's eyes with respect to the reference location. That is, the processor 270 may determine in which direction and how far the driver's eyes are from the reference location.

Based on the direction and distance of the driver's eyes with respect to the reference location, the processor 270 may determine which visual effects are to be added to the augmented reality image. In addition, the processor 270 may determine the size of the determined visual effects.

By performing post-processing on the augmented reality image 1930 with the determined visual effects, the processor 270 may minimize the difference between a real image of the object 1901 and the augmented reality image 1930, the difference which is caused as a location of the driver's eyes is changed within the eye box 1910, and to provide the driver with a further improved image matching result.

Visual effects applicable to the post-processing of an augmented reality image may include at least one of blurring, changing position, changing size, changing shape, and changing tilt with respect to the augmented reality image. For example, when there is difference in horizontal positions between a real image of an object and an augmented reality image thereof as a driver's eyes move from left to right or from right to left relative to Y-axis, the processor 270 may compensate for the inconsistency between the two images by applying visual effects, such as horizontally moving the augmented reality image toward the real image, expanding width of the augmented reality image, or blurring at least part of the augmented reality image.

Figure 23A:
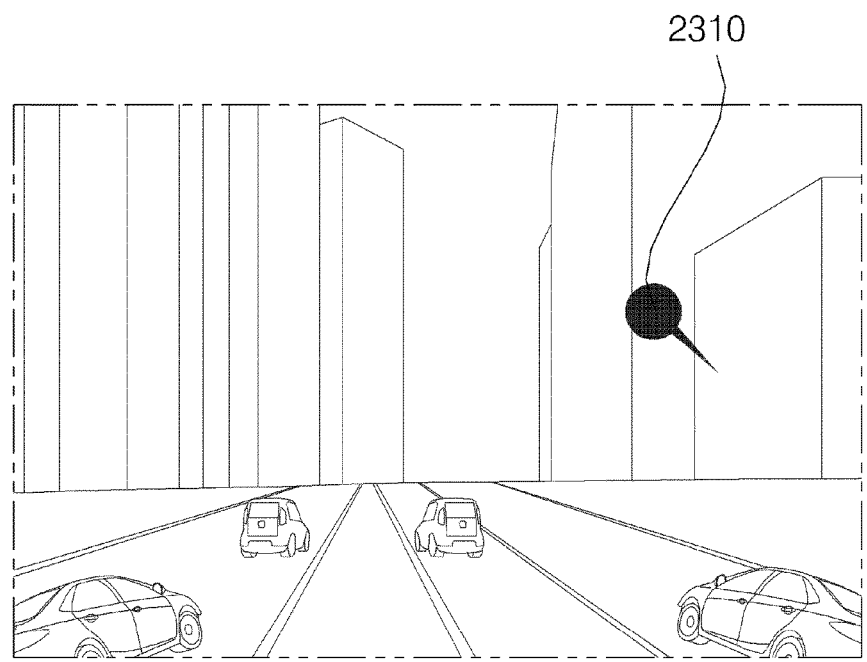
FIGS. 23A to 23B are diagrams for explanation of a graphic object and information which are displayed based on a state of a vehicle according to an embodiment of the present invention.
Figure 23B:
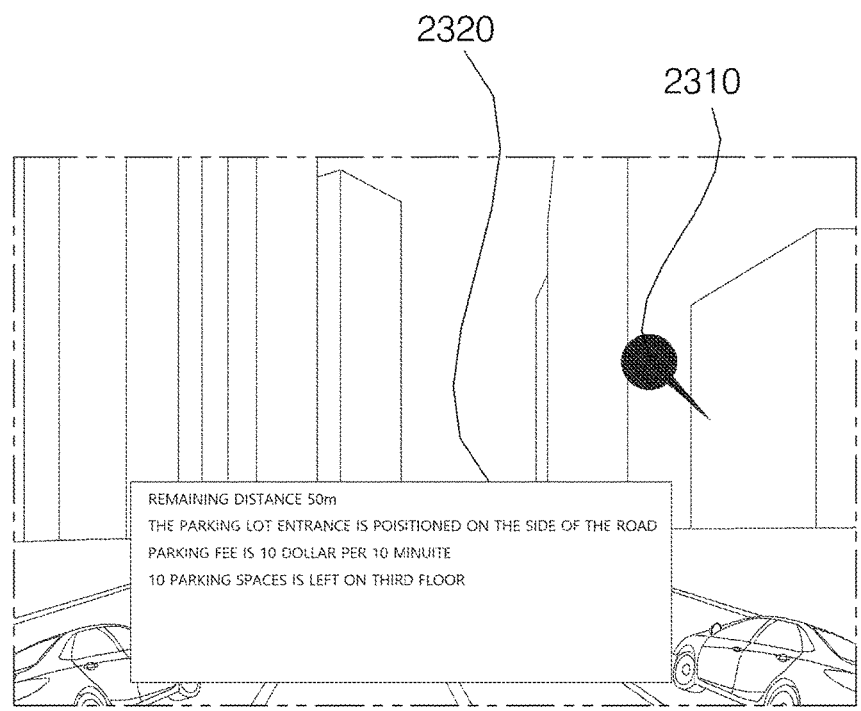

FIGS. 23A to 23B are diagrams for explanation of a graphic object and information which are displayed based on a state of a vehicle according to an embodiment of the present invention.

The processor 270 may receive vehicle state information from the sensing unit 125 via the interface 245.

The vehicle state information may include information indicating whether the vehicle 100 is travelling or is in a stand-still state, and information on speed of the vehicle.

As illustrated in FIG. 23A, when the vehicle 100 is travelling, the processor 270 may control the display unit 251 to display a graphic object 2310 of augmented reality on a vehicle external image.

When the vehicle 100 is travelling not at a low speed, the processor 270 may control the display unit 251 to display the graphic object 2310 of augmented reality on a vehicle external image.

As illustrated in FIG. 23B, when the vehicle 100 is in a stand-still state, the processor 270 may control the display unit 251 to display various types of information on a POI along with the graphic object 2310.

When the vehicle 100 is travelling at a low speed (e.g., travelling at 20 km or less), the processor 270 may control the display unit 251 to display various types of information about a POI along with the graphic object 2310.

The information on the POI may include at least one of the following: information on a location of a parking lot entrance at the POI, information on a parking fee at the POI, and information on parking space at the POI.

Meanwhile, when the vehicle 100 in a stand-still state or travelling at a low speed starts to travel not at a low speed, the processor 270 may control the display unit 251 to remove the information on the POI and thus display the graphic object 2310 alone.

As such, when the vehicle 100 is travelling, a graphic object is displayed without information on a POI. On the other hand, when the vehicle 100 is in a stand-still state or is travelling at a low speed, useful information is provided to a user. In this manner, safe driving may be encouraged.

The present invention as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller. Thus, the above detailed description should not be construed as being limited to the embodiments set forth herein in all terms, but should be considered by way of example. The scope of the present invention should be determined by the reasonable interpretation of the accompanying claims and all changes in the equivalent range of the present invention are intended to be included in the scope of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. A vehicle user interface apparatus comprising:
a display unit;
an interface configured to facilitate exchange of information, data, or a signal across a vehicle;
a processor; and
a computer-readable medium coupled to the processor having stored thereon instructions which, when executed by the processor, causes the processor to perform operations comprising:
receiving a vehicle exterior image via the interface,
marking a first area corresponding to a preset Point of Interest (POI) on the vehicle exterior image,
achieving augmented reality by instructing the display unit to display, along a travel lane, a graphic object on the vehicle exterior image to point out the first area,
instructing the display unit to position the graphic object to a right of the first area on the vehicle exterior image based on the first area being located to a left of the travel lane, and
instructing the display unit to position the graphic object to a left of the first area on the vehicle exterior image based on the first area being located to a right of the travel lane.

2. The vehicle user interface apparatus of claim 1, wherein the POI is a building, and wherein the operations comprise instructing the display unit to position the graphic object to point out a part of the building that is visible from a point of view of the vehicle.

3. The vehicle user interface apparatus of claim 1, wherein the operations comprise determining a part of the first area to be pointed out by the graphic object based on a distance between the vehicle and the POI.

4. The vehicle user interface apparatus of claim 3, wherein the determining of the part of the first area to be pointed out by the graphic object comprises obtaining a plurality of preset ranges of distances between the vehicle and the POI, and
determining the part of the first area to be pointed out by the graphic object based on determining one of the preset ranges of distances in which the distance between the vehicle and the POI falls.

5. The vehicle user interface apparatus of claim 1, wherein the operations comprise determining at least one of a color, a size, or a transparency level of the graphic object based on a distance between the vehicle and the POI.

6. The vehicle user interface apparatus of claim 5, wherein the determining of at least one of the color, the size, or the transparency level of the graphic object comprises:
obtaining a plurality of preset ranges of distances between the vehicle and the POI, and
determining at least one of the color, the size, or the transparency level of the graphic object based on determining one of the preset ranges of distances in which the distance between the vehicle and the POI falls.

7. The vehicle user interface apparatus of claim 1, wherein the operations comprise determining a presence of an object between the vehicle and the POI.

8. The vehicle user interface apparatus of claim 7, wherein the determining of the presence of the object between the vehicle and the POI comprises receiving navigation information via the interface, and
determining, based on the vehicle exterior image and the navigation information, the presence of an object between the vehicle and the POI.

9. The vehicle user interface apparatus of claim 8, wherein the navigation information comprises three-dimensional (3D) map information, and
wherein the operations comprise converting the 3D map information into a two-dimensional (2D) map having a 2D coordinate system of the vehicle exterior image, and
comparing the vehicle exterior image with the 2D map to determine the presence of an object between the vehicle and the POI.

10. The vehicle user interface apparatus of claim 8, wherein the navigation information comprises 3D map information, and
wherein the operations comprise receiving, via the interface, location information, size information, and disparity information of a plurality of objects imaged in the vehicle exterior image, and
comparing the location information, the size information, and the disparity information to the 3D map information to determine the presence of an object between the vehicle and the POI.

11. The vehicle user interface apparatus of claim 7, wherein the operations comprise instructing, in response to a determination of the presence of an object, the display unit to add transparency to the object or remove the object.

12. The vehicle user interface apparatus of claim 7, wherein the operations comprise instructing, in response to determination of the presence of an object, the display unit to gradually move the graphic object over time from a first point of the vehicle exterior image to a second point of the vehicle exterior image that is closer to the first area than the first point is to the first area.

13. The vehicle user interface apparatus of claim 12, wherein the operations comprise instructing the display unit to add transparency to the graphic object based on the graphic object being positioned in an area that overlaps with a displayed object.

14. The vehicle user interface apparatus of claim 7, wherein the operations comprise instructing, in response to determination of the presence of an object, the display unit to additionally display a top-view image.

15. The vehicle user interface apparatus of claim 14, wherein the operations comprise instructing the display unit to highlight an area corresponding to the POI on the top-view image.

16. The vehicle user interface apparatus of claim 7, wherein the operations comprise receiving, in response to determination of the presence of an object, an image of the POI acquired by a different vehicle located in a vicinity of the POI, and instructing the display unit to display the image of the POI from a point of view of the vehicle.

17. The vehicle user interface apparatus of claim 7, wherein the operations comprise instructing, in response to determination of the presence of an object, the display unit to display a sequence of images simulating driving from a location of the vehicle to the POI.

18. The vehicle user interface apparatus of claim 1, wherein the operations comprise instructing the display unit to position the graphic object on an area of the vehicle exterior image that does not overlap with a displayed object.

19. The vehicle user interface apparatus of claim 1, wherein the operations comprise instructing the display unit to add transparency to an object or remove the object based on the graphic object being displayed in an area of the vehicle exterior image that overlaps with a displayed object.

20. The vehicle user interface apparatus of claim 1, wherein the operations further comprise:

receiving information on the travel lane;
based on the information on the travel lane, identifying the travel lane in which the vehicle is located;
based on identifying the travel lane, comparing a location of the first area to a location of the travel lane;
based on the comparison of the location of the first area to the location of the travel lane, determining a relative location of the first area with respect to the travel lane, the relative location indicating whether the first area is located to the left of the travel lane or to the right of the travel lane; and
determining a position of the graphic object on the vehicle exterior image based on the relative location of the first area with respect to the travel lane.

* * * * *